United States Patent
Largo et al.

(10) Patent No.: US 11,911,886 B2
(45) Date of Patent: Feb. 27, 2024

(54) FASTENER-DRIVING TOOL WITH MULTIPLE COMBUSTION CHAMBERS AND USABLE WITH FUEL CANISTERS OF VARYING LENGTHS

(71) Applicant: Illinois Tool Works Inc., Glenview, IL (US)

(72) Inventors: Marc Largo; Maureen Shea, Chicago, IL (US); Charles Zhao, Northbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 180 days.

(21) Appl. No.: 17/530,703

(22) Filed: Nov. 19, 2021

(65) Prior Publication Data

US 2022/0072692 A1 Mar. 10, 2022

Related U.S. Application Data

(63) Continuation of application No. 16/188,787, filed on Nov. 13, 2018, now Pat. No. 11,179,837.

(60) Provisional application No. 62/593,604, filed on Dec. 1, 2017.

(51) Int. Cl.
| | |
|---|---|
| *B25C 1/08* | (2006.01) |
| *F02B 19/02* | (2006.01) |
| *F02B 63/02* | (2006.01) |
| *F02M 21/02* | (2006.01) |
| *F02B 71/04* | (2006.01) |

(52) U.S. Cl.
CPC ............... *B25C 1/08* (2013.01); *F02B 19/02* (2013.01); *F02B 63/02* (2013.01); *F02M 21/0239* (2013.01); *F02M 21/0242* (2013.01); *F02M 21/0281* (2013.01); *F02B 71/04* (2013.01)

(58) Field of Classification Search
CPC .............................. B25C 1/08; F02M 21/0281
See application file for complete search history.

(56) References Cited

U.S. PATENT DOCUMENTS

| | | |
|---|---|---|
| 4,365,471 A | 12/1982 | Adams |
| 4,510,748 A | 4/1985 | Adams |
| 4,665,868 A | 5/1987 | Adams |
| 4,712,379 A | 12/1987 | Adams et al. |
| 4,759,318 A | 7/1988 | Adams |
| 5,377,628 A | 1/1995 | Adams |
| 5,540,194 A | 7/1996 | Adams |
| 6,634,625 B1 | 10/2003 | Adams |

(Continued)

FOREIGN PATENT DOCUMENTS

| | | |
|---|---|---|
| CA | 2 775 311 | 4/2011 |
| EP | 3 195 983 | 7/2017 |
| WO | WO 2011/047485 | 4/2011 |

OTHER PUBLICATIONS

European Search Report for European Application No. 18812530.6, dated Nov. 14, 2022 (4 pages).

(Continued)

*Primary Examiner* — Chelsea E Stinson
(74) *Attorney, Agent, or Firm* — Neal, Gerber & Eisenberg LLP

(57) ABSTRACT

Various embodiments of the present disclosure provide a combustion-powered fastener-driving tool including multiple combustion chambers and/or usable with fuel canisters of varying lengths.

20 Claims, 20 Drawing Sheets

(56) References Cited

U.S. PATENT DOCUMENTS

| | | |
|---|---|---|
| 6,647,969 B1 | 11/2003 | Adams |
| 6,755,159 B1 | 6/2004 | Adams et al. |
| 6,779,493 B2 | 8/2004 | Doherty et al. |
| 6,840,033 B2 | 1/2005 | Adams |
| 6,863,045 B2 | 3/2005 | Ricordi |
| 6,874,452 B2 | 4/2005 | Adams |
| 6,892,524 B1 | 5/2005 | Van Erden et al. |
| 6,912,988 B2 | 7/2005 | Adams |
| 6,932,031 B2 | 8/2005 | Adams |
| 6,966,478 B2 | 11/2005 | Adams et al. |
| 7,770,772 B2 | 8/2010 | Adams |
| 7,938,104 B2 | 5/2011 | Adams |
| 8,087,394 B2 | 1/2012 | Adams |
| 8,205,582 B2 | 6/2012 | Adams |
| 8,347,832 B2 | 1/2013 | Adams |
| 8,511,264 B2 | 8/2013 | Adams |
| 8,925,517 B2 | 1/2015 | Adams |
| 9,638,092 B2 | 5/2017 | Adams |
| 2002/0134069 A1 | 9/2002 | Adams |
| 2002/0134345 A1 | 9/2002 | Adams |
| 2002/0144498 A1 | 10/2002 | Adams |
| 2004/0144012 A1 | 7/2004 | Adams |
| 2006/0186230 A1 | 8/2006 | Adams |
| 2007/0175324 A1 | 8/2007 | Adams |
| 2010/0096429 A1* | 4/2010 | Ho ............................ B25C 1/08 227/130 |
| 2011/0005502 A1 | 1/2011 | Adams |
| 2012/0210974 A1 | 8/2012 | Adams |
| 2015/0369118 A1 | 12/2015 | Adams |
| 2017/0173771 A1 | 6/2017 | Grandjean et al. |
| 2017/0173772 A1* | 6/2017 | Cordeiro ................. B25C 1/163 |
| 2017/0173773 A1 | 6/2017 | Cordeiro et al. |
| 2017/0203424 A1 | 7/2017 | Vettoretti et al. |
| 2017/0203425 A1 | 7/2017 | Herelier et al. |
| 2018/0036871 A1 | 2/2018 | Cordeiro et al. |

OTHER PUBLICATIONS

International Search Report and Written Opinion from International Application No. PCT/US2018/061018, dated May 8, 2019 (19 pages).

* cited by examiner

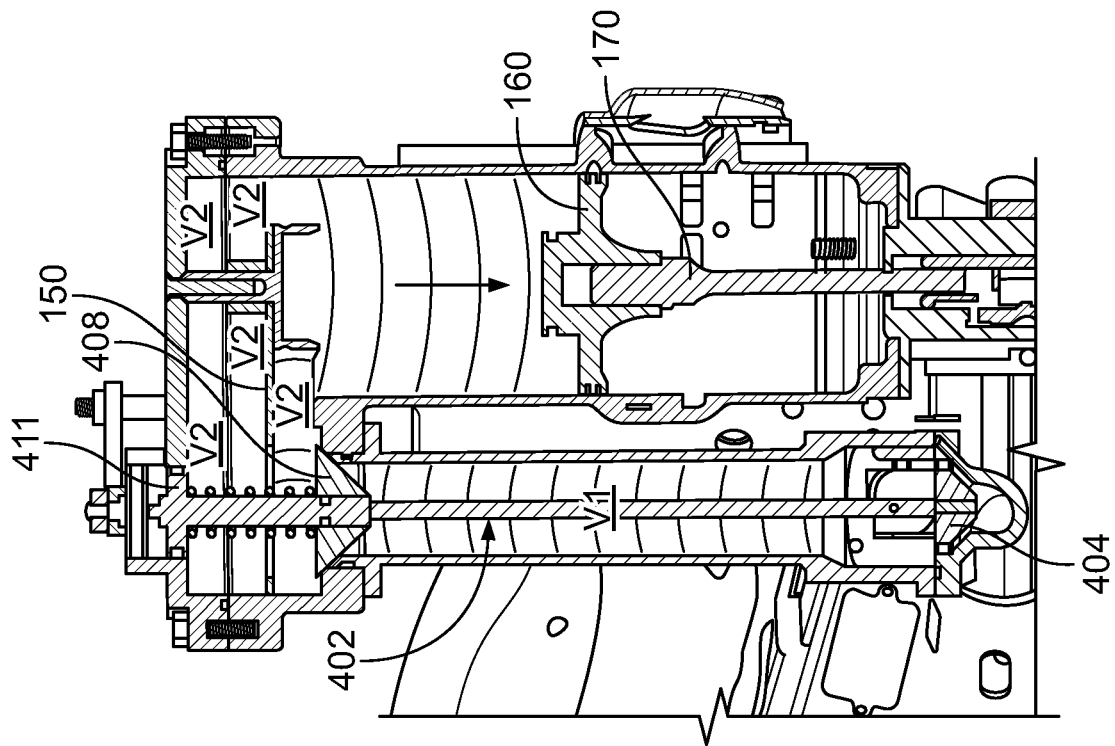
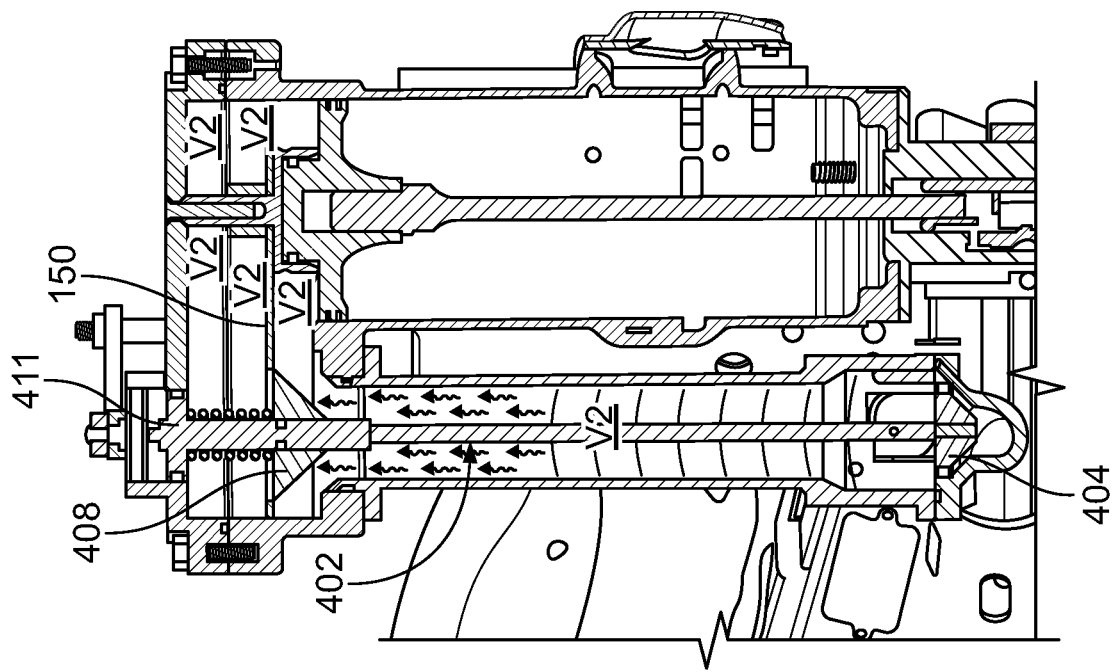

FASTENER-DRIVING TOOL WITH MULTIPLE COMBUSTION CHAMBERS AND USABLE WITH FUEL CANISTERS OF VARYING LENGTHS

PRIORITY

This application claims priority to and the benefit of U.S. patent application Ser. No. 16/188,787, filed Nov. 13, 2018, which claims priority to and the benefit of U.S. Provisional Patent Application Ser. No. 62/593,604, filed Dec. 1, 2017, the entire contents of each of which are incorporated herein by reference.

FIELD

The present disclosure relates to fastener-driving tools. More specifically, the present disclosure relates to combustion-powered fastener-driving tools.

BACKGROUND

Generally, powered fastener-driving tools use one of several types of power sources to carry out a fastener-driving cycle to drive a fastener (such as a nail or a staple) into a workpiece. More specifically, a powered fastener-driving tool uses a power source to force a driving assembly, such as a piston carrying a driver blade, through a cylinder from a pre-firing position to a firing position. As the driving assembly moves to the firing position, the driver blade travels through a nosepiece, which guides the driver blade to contact a fastener housed in the nosepiece. Continued movement of the driving assembly through the cylinder toward the firing position forces the driver blade to drive the fastener from the nosepiece into the workpiece. The driving assembly is then forced back to the pre-firing position in a way that depends on the tool's construction and power source. A fastener-advancing device forces another fastener from a magazine into the nosepiece, and the tool is ready to fire again.

Combustion-powered fastener-driving tools typically use a small internal combustion assembly as their power source. To operate a typical combustion-powered fastener-driving tool, an operator depresses a workpiece-contact element of the tool onto a workpiece. This moves the workpiece-contact element from an extended position to a retracted position, which causes one or more mechanical linkages to cause: (1) a valve sleeve to move to a sealed position to seal a combustion chamber that is in fluid communication with the cylinder; and (2) a fuel delivery system to dispense fuel from a fuel canister into the (now sealed) combustion chamber.

The operator then pulls the trigger to actuate a trigger switch, thereby causing a spark generator to deliver a spark and ignite the fuel/air mixture in the combustion chamber to start the fastener-driving cycle. This generates high-pressure combustion gases that expand and act on the piston to force the driving assembly to move through the cylinder from the pre-firing position to the firing position, thereby causing the driver blade to contact a fastener housed in the nosepiece and drive the fastener from the nosepiece into the workpiece.

Just before the driving assembly reaches the firing position, the piston passes exhaust check valves defined through the cylinder, and some of the combustion gases that propel the piston exhaust through the check valves to atmosphere. This, combined with heat exchange to the atmosphere, and the fact that the combustion chamber remains sealed during the fastener-driving cycle, generates a vacuum pressure above the piston, which causes the driving assembly to retract to the pre-firing position to complete the fastener-driving cycle. When the operator removes the workpiece-contact element from the workpiece, a spring biases the workpiece-contact element from the retracted position to the extended position, causing the one or more mechanical linkages to move the valve sleeve to an unsealed position to unseal the combustion chamber.

SUMMARY

Various embodiments of the present disclosure provide a combustion-powered fastener-driving tool including multiple combustion chambers and usable with fuel canisters of varying lengths.

In various embodiments, the fastener-driving tool comprises a combustion cylinder partially defining a first combustion chamber (having a first volume generally indicated herein as V1), a fuel assembly configured to direct a fuel/air mixture to the first combustion chamber, a combustion and drive cylinder attached to the combustion cylinder and partially defining a second combustion chamber (having a first volume generally indicated herein as V1), and a combustion chamber sealing assembly. In various embodiments, the combustion chamber sealing assembly comprises: (a) a combustion chamber shaft; (b) a first seat disc fixedly attached to the combustion chamber shaft; (c) a second seat disc slidably mounted to the combustion chamber shaft; (d) a second seat disc biasing element that biases the second seat disc to a biased position; and (e) a third seat disc or cover-sealing portion that is part of or extends outwardly from the combustion chamber shaft.

In various such embodiments, when the combustion chamber sealing assembly is in an unsealed configuration, the first seat disc is disengaged from a first valve seat and the second seat disc is disengaged from a second valve seat such that the fuel assembly, the first combustion chamber, and the second combustion chamber are in fluid communication.

In these various embodiments, when the combustion chamber sealing assembly is in a sealed configuration, the first seat disc sealingly engages the first valve seat and the second seat disc sealingly engages the second valve seat such that the fuel assembly, the first combustion chamber, and the second combustion chamber are not in fluid communication.

In these various embodiments, when the combustion chamber sealing assembly is in a partially sealed configuration, the first seat disc sealingly engages the first valve seat and the second seat disc is displaced from the biased position and disengaged from a second valve seat such that the fuel assembly and the first combustion chamber are not in fluid communication, but the first combustion chamber and the second combustion chamber are in fluid communication.

In various embodiments, the second seat disc is made from a metallic material. This is an improvement over known elastomeric materials in that the second seat disc will not deform or degrade over time when subject to the high temperatures and pressures in the first and second combustion chambers.

In various embodiments, the fastener-driving tool comprises a combustion cylinder defining a combustion chamber, a fuel assembly, and a canister mover. The fuel assembly comprises a fuel routing subassembly configured to direct a fuel/air mixture to the combustion chamber and a canister-mounting carriage movable relative to the fuel routing subassembly between a rest position and a dispense position. The canister-mounting carriage is configured to hold a fuel canister such that the fuel canister moves with the canister-mounting carriage. The canister mover is movable from a rest position to a dispense position to cause the canister-mounting carriage to move from the rest position to the dispense position.

In these various embodiments, the canister-mounting carriage is configured to receive fuel canisters of a range of different sizes. This renders the tool more user-friendly in that any of a number of different fuel canisters can be used to power the tool.

In various embodiments, the fuel routing subassembly includes a fuel receiver, a flexible metal tube, and a jet pump. The fuel receiver is configured to receive fuel dispensed from the fuel canister, and the flexible metal tube is configured to route the fuel from the fuel receiver to the jet pump, which aspirates the fuel while delivering it to the combustion chamber. The flexible metal is sized, shaped, and formed from a metallic material with suitable properties to enable the flexible metal tube to bend to absorb forces imposed on the fuel routing subassembly during actuation of the tool. The ability of the flexible metal tube to act as a shock absorber isolates more fragile components, like the jet pump, from forces generated during actuation of the tool (or at least reduces the forces imposed on those more fragile components).

BRIEF DESCRIPTION OF THE FIGURES

FIGS. 14A, 14B, 14C, 14D, 14E, and 14F are cross-sectional views of certain components of the tool at different stages of an actuation of the tool.

DETAILED DESCRIPTION

Figure 1A:
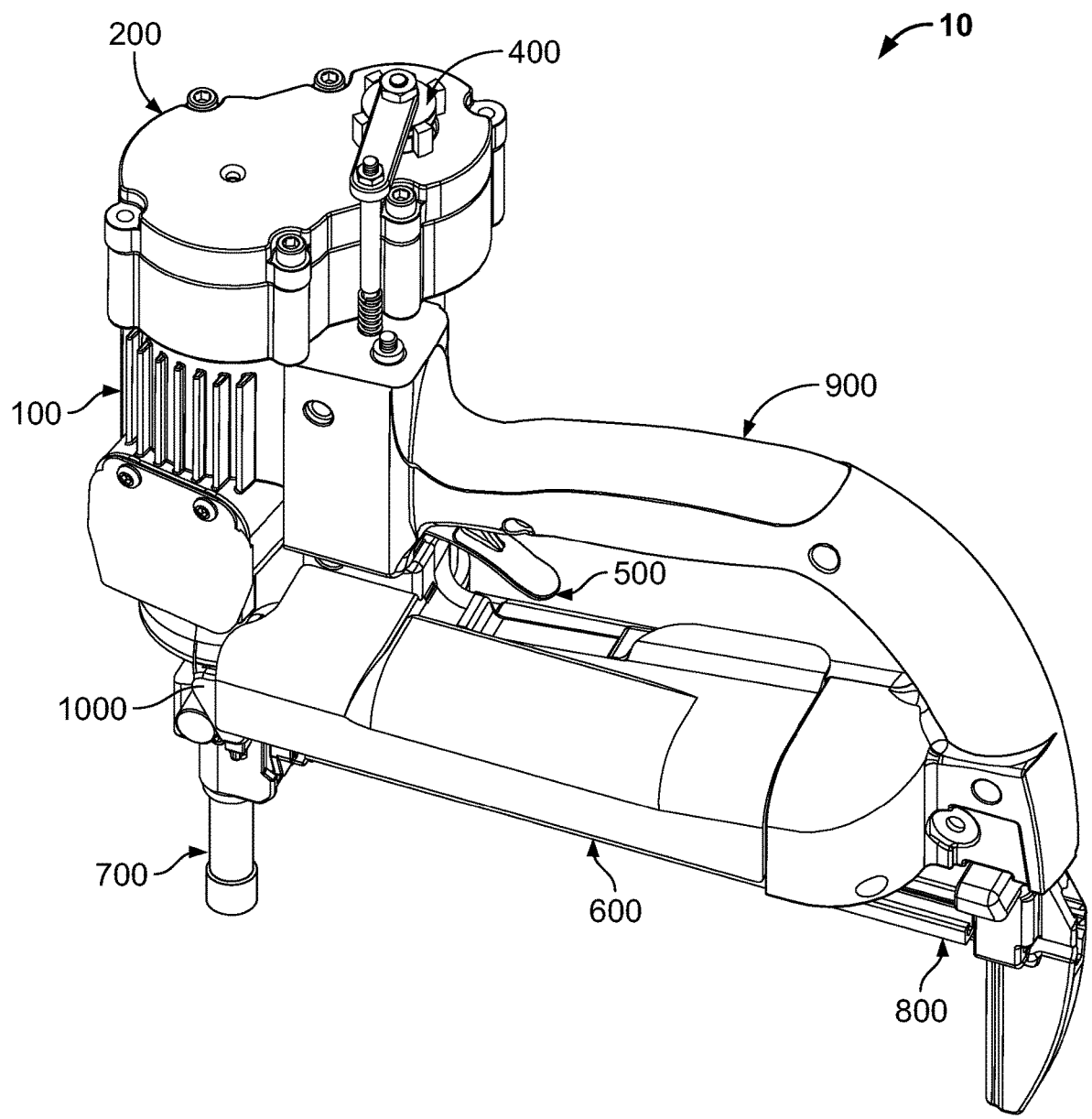
FIG. 1A is a left side perspective view of one example embodiment of the tool of the present disclosure.
Figure 1B:
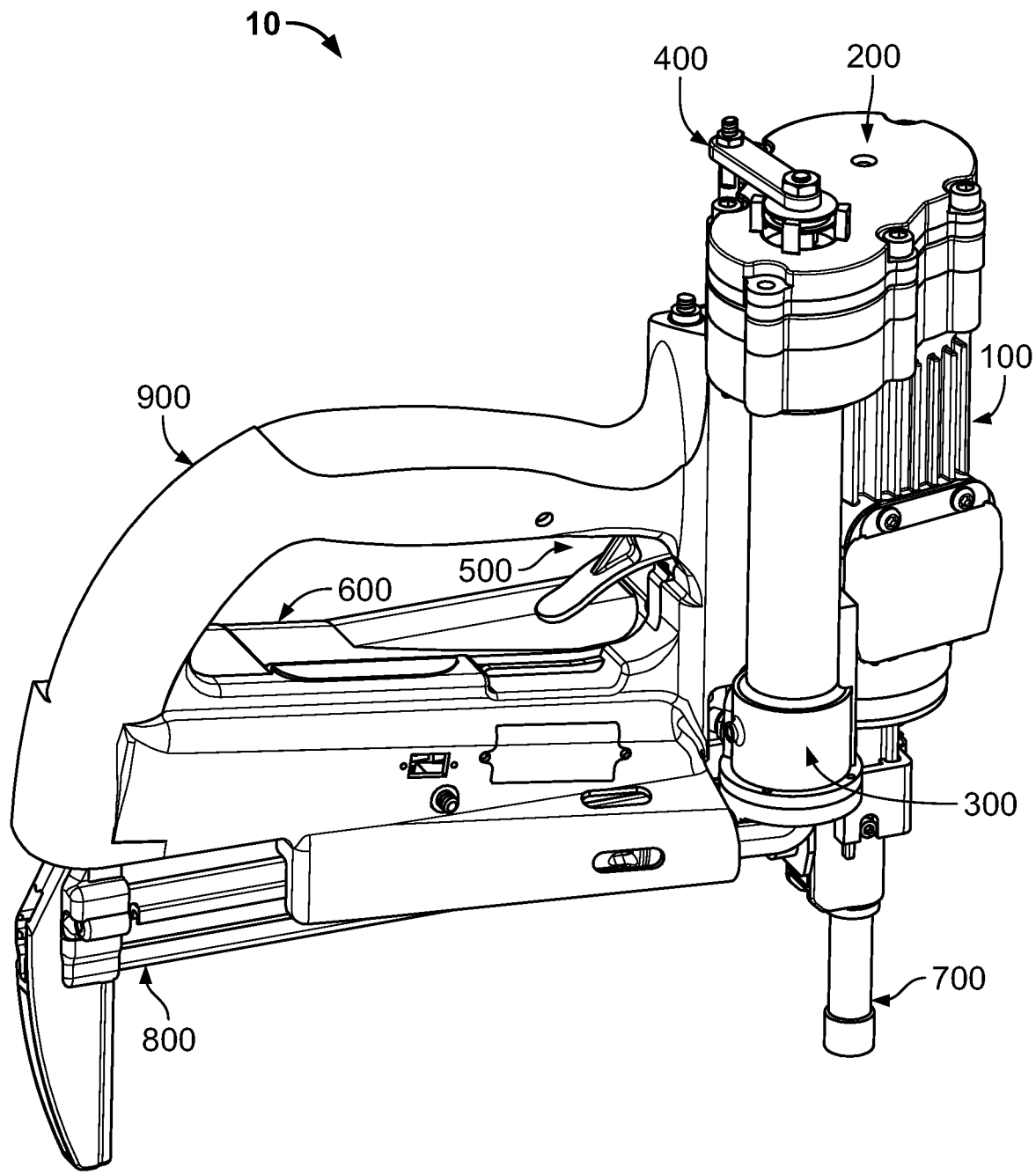
FIG. 1B is a right side perspective view of the tool of FIG. 1.

Various embodiments of the present disclosure provide a combustion-powered fastener-driving tool including multiple combustion chambers and usable with fuel canisters of varying lengths. FIGS. 1A to 13B illustrate one example embodiment of the combustion-powered fastener-driving tool indicated by numeral 10 (and sometimes referred to herein as the "tool" for brevity) or its components. FIGS. 14A to 14F show selected components of the tool 10 during an actuation of the tool 10 to drive a fastener into a workpiece.

As best shown in FIGS. 1A, 1B, 2A, and 2B, the illustrated example tool 10 includes a combustion and drive cylinder 100, a combustion and drive cylinder cover 200, a combustion cylinder 300, a combustion chamber sealing assembly 400, a trigger assembly 500, a fuel assembly 600, a nosepiece assembly 700, a magazine assembly 800, a handle assembly 900, and a canister mover 1000.

The combustion and drive cylinder cover 200 is attached via suitable fasteners (not labeled) to the combustion and drive cylinder 100. The combustion cylinder 300 is attached via suitable fasteners (not labeled) to the combustion and drive cylinder 100 and to the fuel assembly 600. The combustion chamber sealing assembly 400 is attached to the trigger assembly 500 via a trigger connector (described below). The trigger assembly 500 is mounted to the handle assembly 900 via a trigger pin (described below) such that part of the trigger assembly 500 can move relative to the handle assembly 900 (described below). The fuel assembly 600 is attached via suitable fasteners (not labeled) to the combustion cylinder 300 and to the combustion and drive cylinder 100. The nosepiece assembly 700 is attached via suitable fasteners (not labeled) to the combustion and drive cylinder 100. The magazine assembly 800 is attached via suitable fasteners (not labeled) to the nosepiece assembly 700 and to the handle assembly 900. The handle assembly 900 is attached via suitable fasteners (not labeled) to the combustion and drive cylinder 100 and to the magazine assembly 800. The canister mover 1000 is attached via a suitable fastener (not labeled) to the combustion and drive cylinder 100 such that the canister mover 1000 can rotate relative to the combustion and drive cylinder 100 (as described below).

Figure 3:
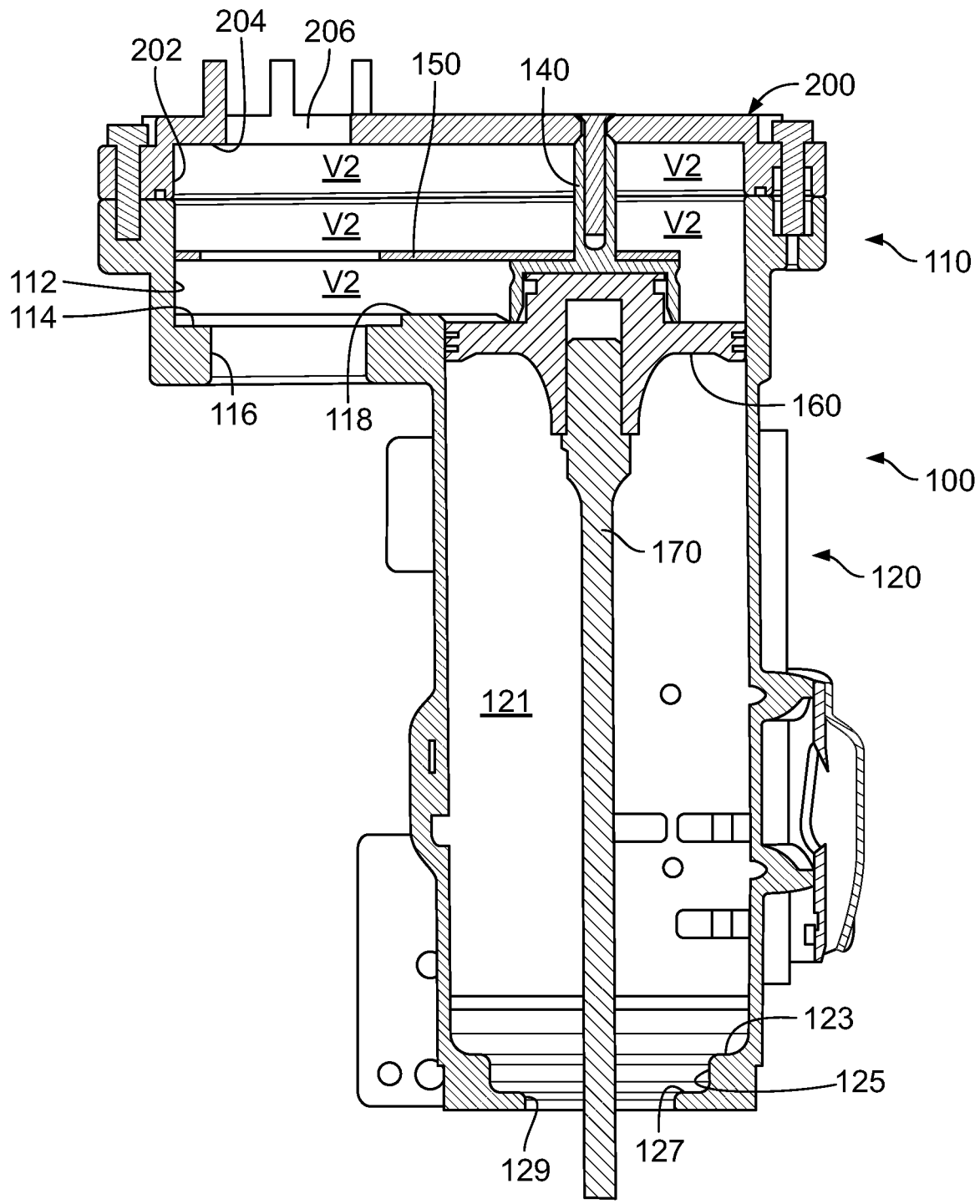
FIG. 3 is a cross-sectional view of a combustion and drive cylinder of the tool of FIG. 1A.

As shown in FIG. 3, the combustion and drive cylinder 100 includes a body including a second combustion chamber portion 110 and a drive chamber portion 120. Certain inner walls of the second combustion chamber portion 110, certain inner walls of the combustion and drive cylinder cover 200 (such as wall 204), a third seat disc or cover seat portion 411 (described below), a second seat disc 408 (described below), a piston stopper 140 (described below), and a piston 160 (described below) collectively define a second combustion chamber having a volume V2. In this illustrated example embodiment of the present disclosure, all of the spaces labeled V2 collectively form the second combustion chamber (as generally shown in FIGS. 3, 6A, 6B, 6C, 14C, 14D, 14E, and 14F). It should be appreciated that these spaces can have different heights and different lengths and widths in accordance with the present disclosure.

In this example embodiment, V2 is approximately 9 cubic inches, though it may be any other suitable value or size in other embodiments of the present disclosure.

The drive chamber portion 120 defines a generally cylindrical drive chamber in this illustrated example embodiment. However, it should be appreciated that this drive chamber may be alternatively formed in accordance with the present disclosure.

The piston stopper 140 is attached to the cover 200 via a suitable fastener (not labeled). The piston 160 has a driver blade 170 attached thereto and is slidably disposed within the drive chamber and movable between a pre-drive position in which the piston 160 is received in a piston-receiving cavity (not labeled) formed by the piston stopper 140 (as shown in FIG. 3) and a driven position in which the piston 160 is at a lower end of the drive chamber (not shown). A divider 150 is positioned within the second combustion chamber as shown in FIGS. 3, 14C, 14D, 14E, and 14F.

Several air exit openings (not labeled) are defined through the drive chamber portion 120 of the combustion and drive cylinder 100 to fluidly connect the drive chamber with the atmosphere. As described below, as the piston moves from the pre-drive position to the driven position during an actuation of the tool 10, the piston forces air below it out of the exit openings and into the atmosphere. As best shown in FIGS. 1A, 1B, 2A, and 2B, multiple suitable mufflers (not labeled) are attached to the outer surface of the drive chamber portion 120 adjacent the exit openings to reduce the noise of the air exiting the drive chamber through the exit openings during actuation. In this illustrated example embodiment, the exhaust openings have check (reed type) valves.

The divider 150 provides a mechanism to control the flow of the air/fuel mixture for even distribution from the lower portion of the V2 combustion chamber to the upper part of the V2 combustion chamber in this illustrated example embodiment.

In this example embodiment, the tool includes a suitable bumper (not shown) in the cylinder to absorb excess piston energy or over travel and also to partially assist piston return.

Figure 4:
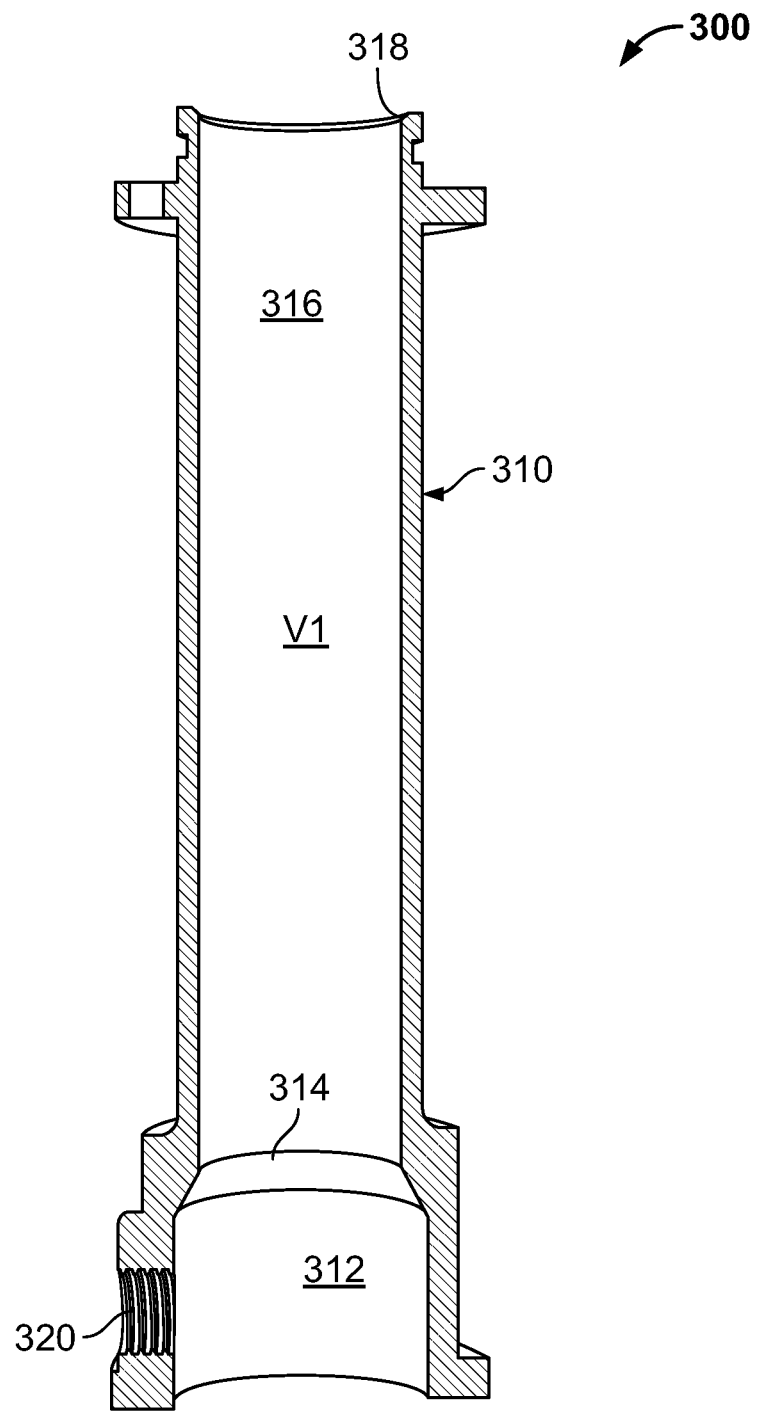
FIG. 4 is a cross-sectional view of a combustion cylinder of the tool of FIG. 1A.

As best shown in FIG. 4, the combustion cylinder 300 includes a tubular body 310. One end of the body 310 includes an annular, tapered second valve seat 318. A surface 320 near the other end of the body 310 defines a cylindrical spark generator mounting opening sized to receive a suitable spark generator. Inner walls of the body 310, the second seat disc 408 (described below), and a first seat disc 404 (described below) collectively define a first combustion chamber having a volume V1. In this illustrated example embodiment of the present disclosure, all of the spaces labeled V1 collectively form the first combustion chamber (as generally shown in FIGS. 4, 6A, 6B, 6C, 14C, 14D, 14E, and 14F).

In this illustrated example embodiment, V1 is approximately 5 cubic inches, though it may be any other suitable value or size in other embodiments of the present disclosure. In this example illustrated embodiment, V1 to V2 has a 5 to 9 ratio. Thus, in this and various other embodiments of the present disclosure V1 is smaller than V2.

In various other embodiments of the present disclosure, V1 is equal to or approximately equal to V2 (i.e., they generally have a 1 to 1 ratio).

In various other embodiments of the present disclosure, V1 is greater than V2 (such as having a 2 to 1 ratio).

In various embodiments, the ratio of the V1 internal diameter to the length of V1 is preferably less than 1 to 6.

Figure 5:
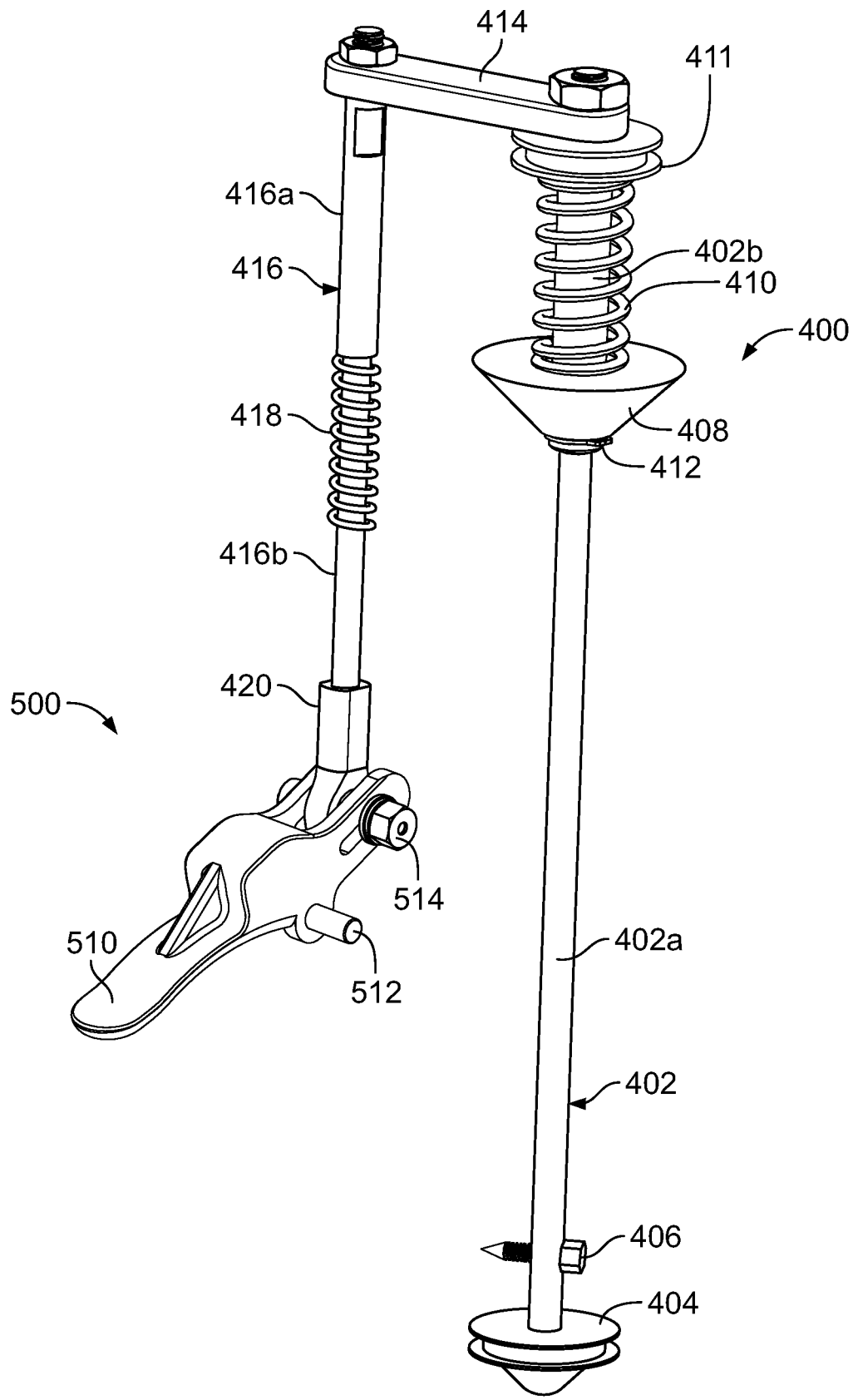
FIG. 5 is a perspective view of the combustion chamber sealing assembly and the trigger assembly of the tool of FIG. 1A.

As best shown in FIG. 5, the combustion chamber sealing assembly 400 includes a combustion chamber shaft 402, a lower or first seat disc 404, an electrode 406, a second seat disc 408, a second seat disc spring 410 (or any suitable biasing element), a retaining element 412, a link 414, a trigger-connection shaft 416, a trigger spring 418 (or any suitable biasing element), a trigger connector 420, and a third seat disc or cover seat portion 411.

The combustion chamber shaft 402 includes a first portion 402a and a second portion 402b that extends between the first portion 402a and the third seat disc or cover-sealing portion 411. The second portion 402b has a larger diameter than the first portion 402a, and the third seat disc or cover-sealing portion 411 has a larger diameter than the second portion 402b. The trigger-connection shaft 416 includes a first portion 416a, a second portion 416b, and an annular biasing element seat (not labeled) formed between the first portion 416a and the second portion 416b.

The first seat disc 404 is fixedly connected to the free end of the first portion 402a of the combustion chamber shaft 402. In this illustrated example embodiment, the first seat disc 404 is made of an elastomer such as a nitrile (though it may be made of any suitable material in other embodiments of the present disclosure). The electrode 406 is threadably received in an opening defined by a threaded surface (not labeled) of the first portion 402a of the combustion chamber shaft 402 located a distance D1 from the free end of the first portion 402a. In this illustrated example embodiment, D1 is 0.125 inches, though it may be any suitable distance in other embodiments (provided that the electrode is adjacent the spark generator when the combustion chamber sealing assembly 400 is in the sealed configuration as described below). In this illustrated example embodiment, the electrode 406 is made of aluminum (though it may be made of any suitable material in other embodiments). The electrode 406 is removable, which enables an operator to replace the electrode 406 once it stops operating as needed to generate a spark (e.g., after the electrode 406 corrodes after generating a spark for a particular quantity of actuations of the tool 10).

The retaining element 412 is received in an annular recess defined in the second portion 402b of the combustion chamber shaft 402 near where the second portion 402b joins the first portion 402a of the combustion chamber shaft 402. The retaining element 412 is not slidable along and relative to the combustion chamber shaft 402. The second seat disc 408 is slidably mounted to the second portion 402b of the combustion chamber shaft 402 between the retaining element 412 and the third seat disc or cover-sealing portion 411 of the combustion chamber shaft 402 such that the second seat disc 408 can slide along and relative to the combustion chamber shaft 402. In this example embodiment, the second seat disc is frustoconical and made of a metallic material such as aluminum (though it may be made of any suitable material and take any suitable shape in other embodiments of the present disclosure). This is an improvement over known elastomeric materials in that the second seat disc will not deform or degrade over time when subject to the high temperatures and pressures in the first and second combustion chambers. Another advantage provided by the metallic second seat disc (over an elastomeric disc) is that the bias member 410 can be a coil spring that can be tuned for initial preload and opening rate. Another advantage provided by the metallic second seat disc (over an elastomeric disc) is that the shape can be made to direct the flow (air/fuel and or combusted gas) to desired area in the V2 combustion chamber.

The second seat disc spring 410 is disposed around the second portion 402b of the combustion chamber shaft 402 between the second seat disc 408 and the third seat disc or cover-sealing portion 411 of the combustion chamber shaft 402. The second seat disc spring 410 biases the second seat disc 408 away from the third seat disc or cover-sealing portion 411 of the combustion chamber shaft 402 and to a biased position in which the seat disc 408 contacts the retaining element 412.

Figure 6A:
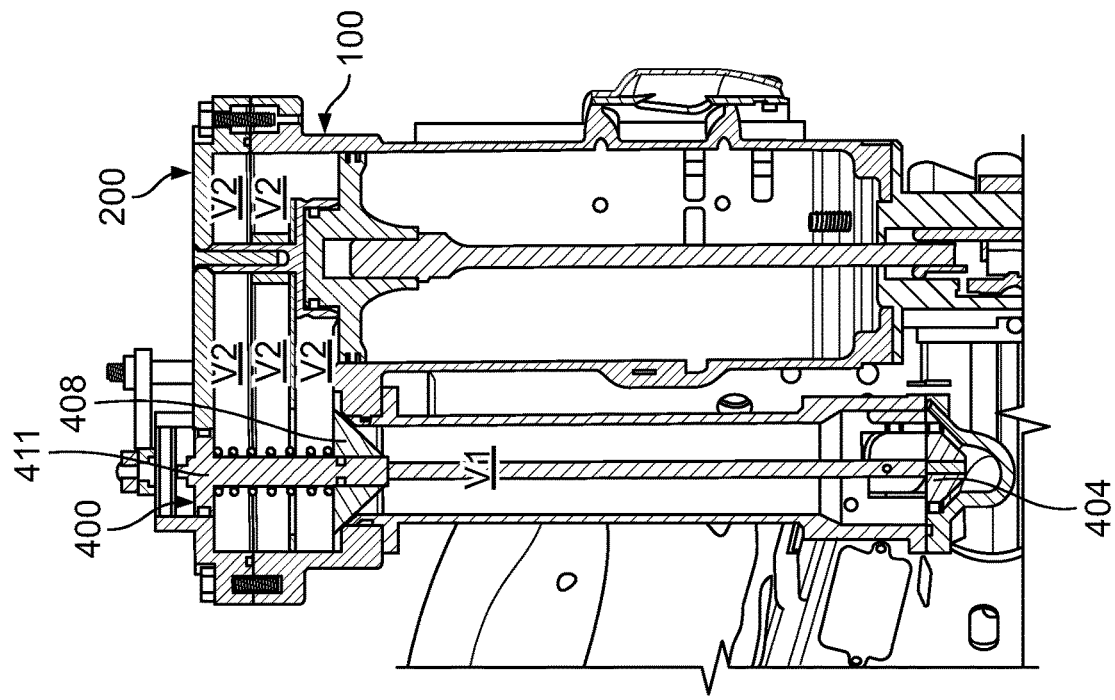
FIGS. 6A, 6B, and 6C are cross-sectional views of the tool of FIG. 1A showing the combustion chamber sealing assembly in its unsealed, sealed, and partially sealed configurations, respectively.
Figure 14A:
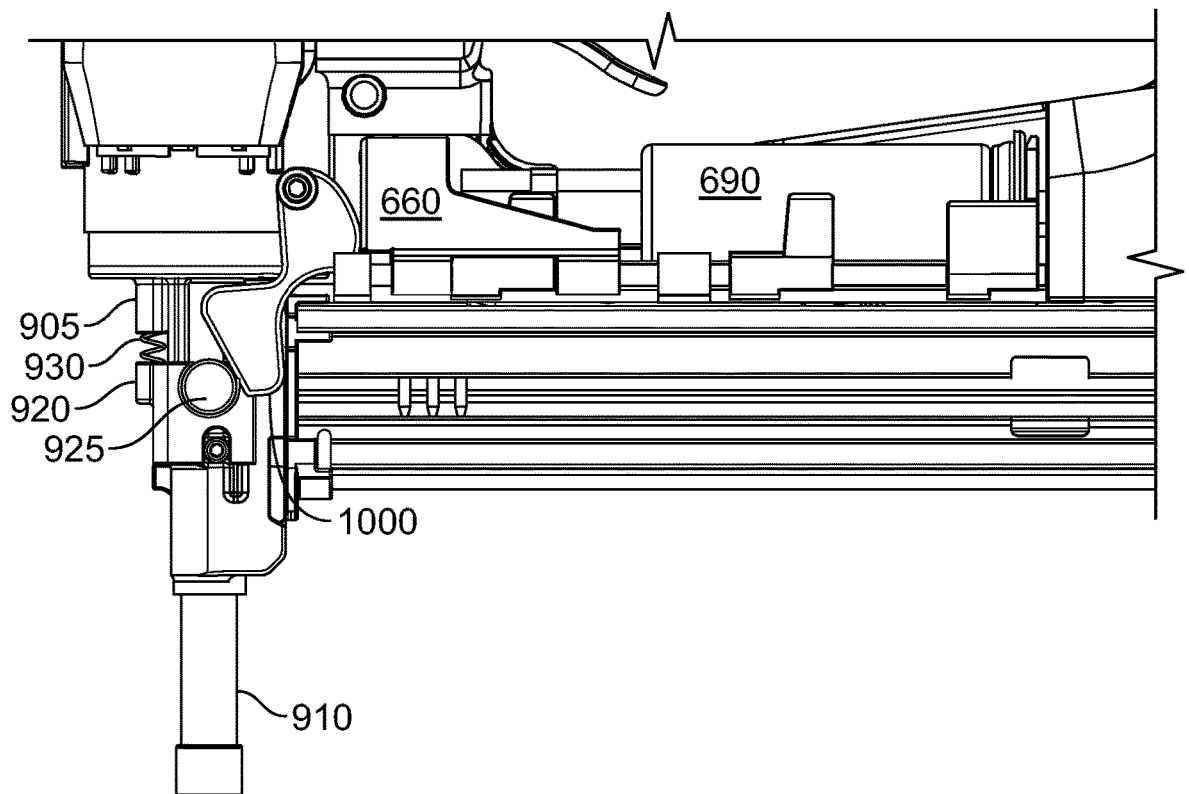
Figure 14B:
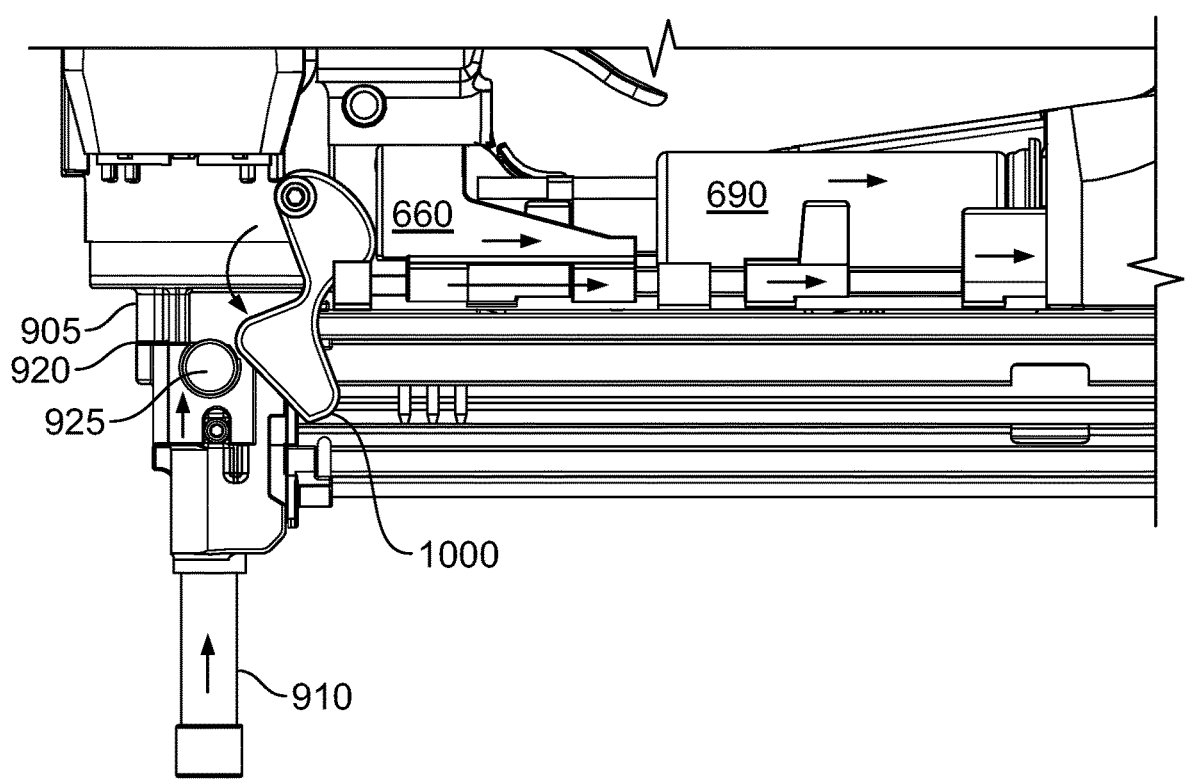
Figure 14D:
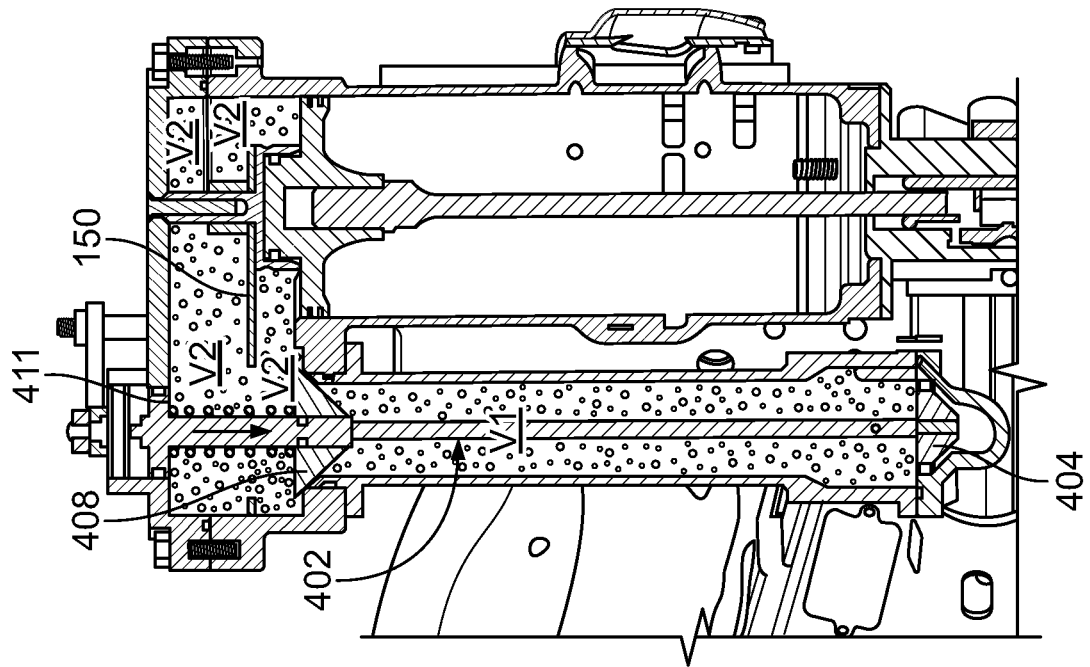
Figure 14C:
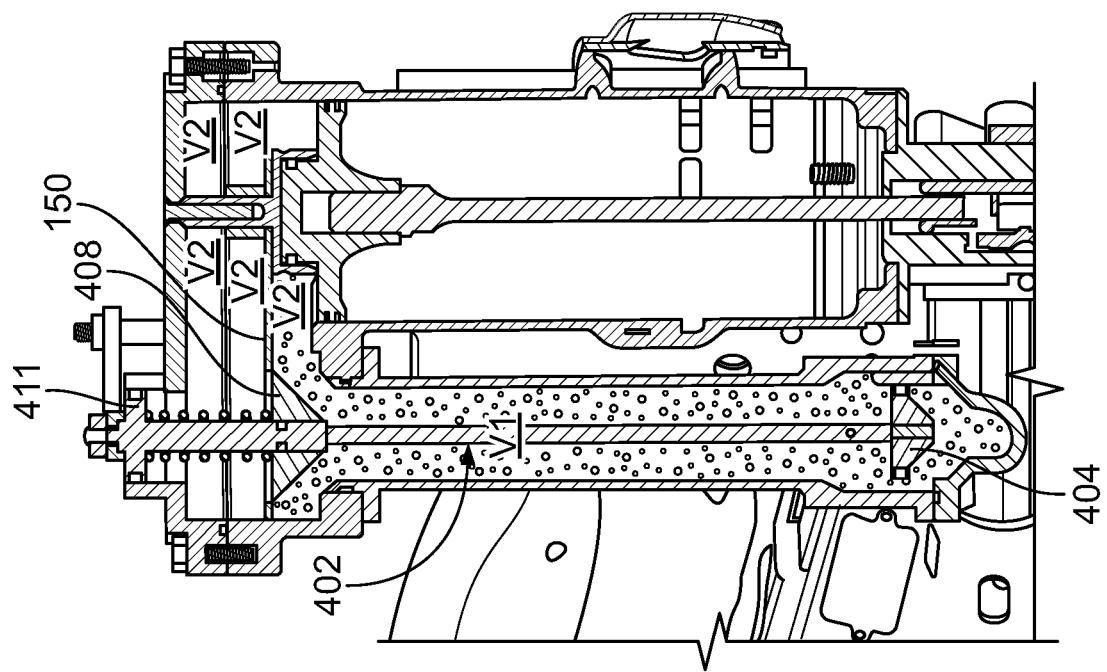

The third seat disc or cover seat portion 411 is fixedly attached to the second portion 402b of the shaft 402 and configured to move with the movement of the shaft 402 to a closed position where it seals the opening 206 (see FIG. 3) in the cover 202 (as shown in FIGS. 6B, 6C, 14D, 14E, and 14F) and to an open position where it allows venting of the second combustion chamber (as shown in FIGS. 6A and 14C).

The link 414 connects the combustion chamber shaft 402 and the trigger-connection shaft 416. The trigger connector 420 is attached to the free end of the second portion 416b of the trigger-connection shaft 416 and attaches the combustion chamber sealing assembly 400 to the trigger assembly 500 (described below). The trigger spring 418 is disposed around the second portion 416b of the trigger-connection shaft 416 between the trigger spring seat and the trigger connector 420.

The trigger assembly 500 includes a trigger 510, a trigger-mounting pin 512, and a combustion chamber sealing assembly connection assembly 514. The trigger-mounting pin 512 extends through multiple mounting openings (not labeled) defined in the trigger 510. The ends of the trigger-mounting pin 512 are received in suitable bosses defined in the handle assembly 900 (not shown) such that the trigger 510 is rotatable about the trigger-mounting pin 512 relative to the handle assembly 900 between a rest position and an actuated position (described below). The combustion chamber sealing assembly connection assembly 514 includes a pin (not shown) that extends through multiple slots (not labeled) defined in the trigger 510 and an opening defined in the trigger connector 420 of the combustion chamber sealing assembly 400. This links the trigger 510 to the combustion chamber sealing assembly 400 such that movement of the trigger 510 causes movement of the combustion chamber sealing assembly 400, as described below.

Figure 2A:
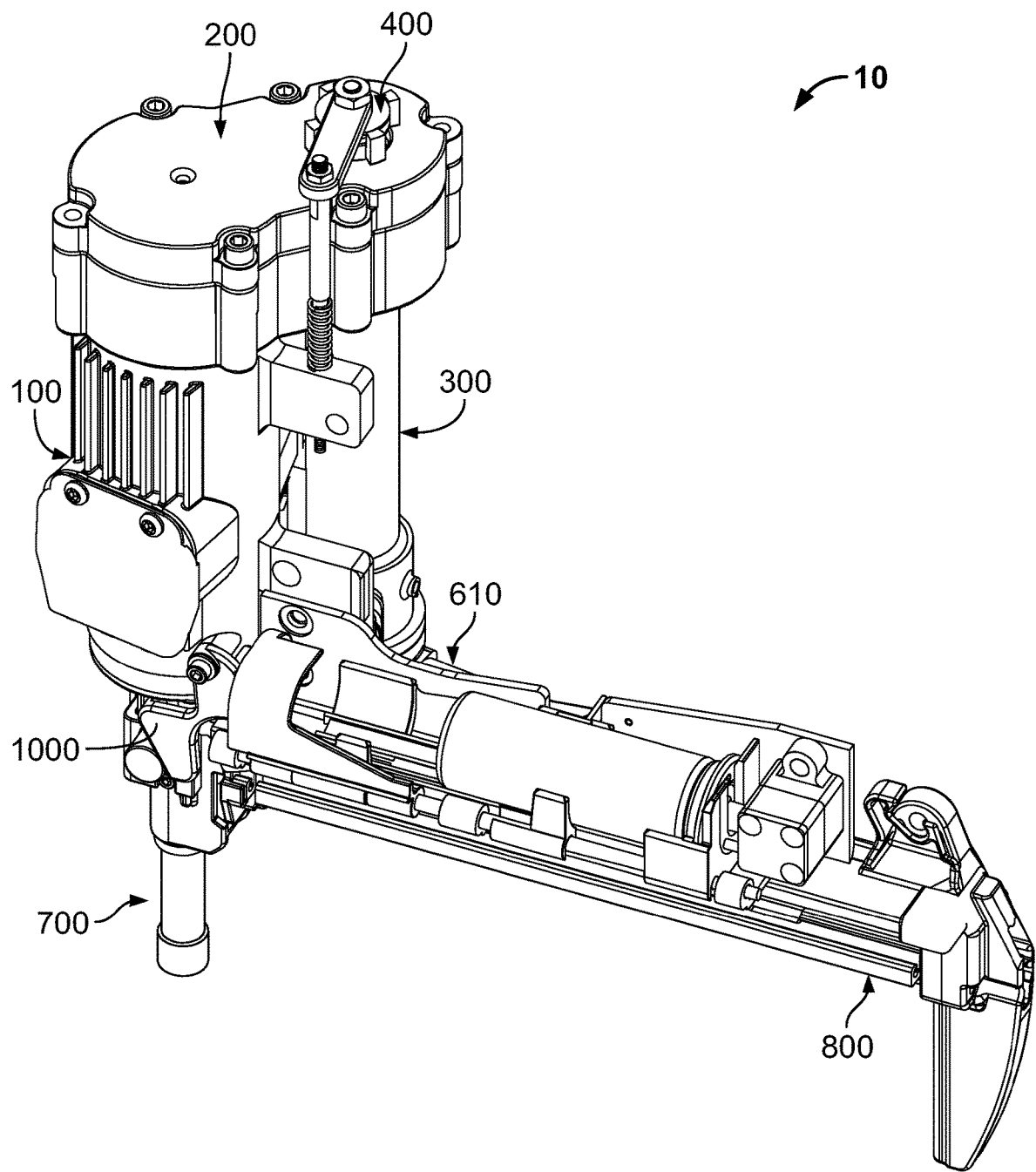
FIGS. 2A and 2B are perspective views of the tool of FIG. 1A with certain components removed.
Figure 2B:
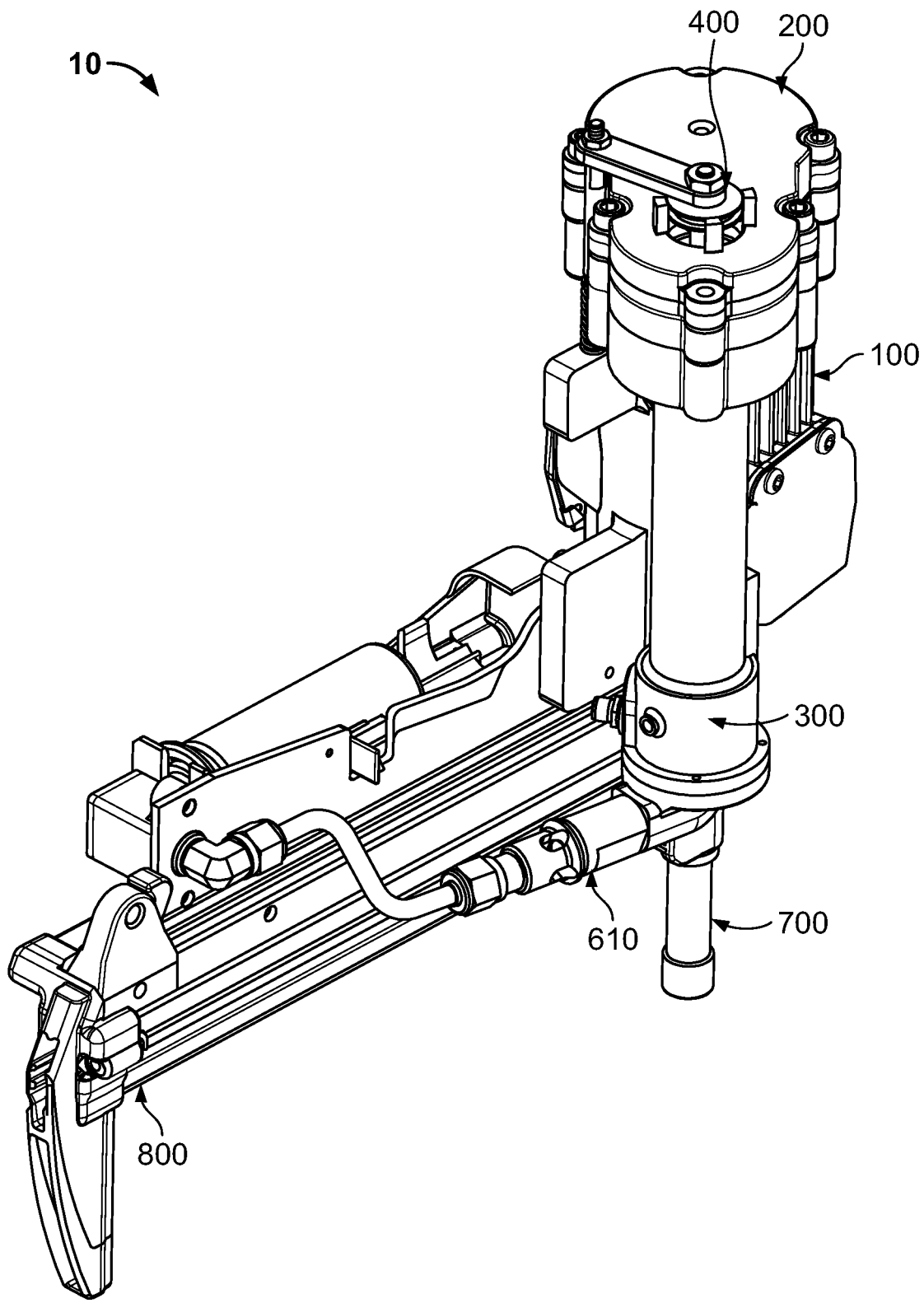

As best shown in FIG. 2A, the combustion chamber sealing assembly 400 is attached to the trigger assembly 500 such that the trigger spring 418 extends between the trigger spring seat of the trigger-connection shaft 416 and a portion of the combustion and drive cylinder 100. This positioning causes the trigger spring 418 to bias the trigger 510 to the rest position. When the operator pulls the trigger 510 to move it from the rest position to the actuated position, the trigger 510 forces the trigger-connection shaft 416 (as well as the rest of the combustion chamber sealing assembly 400) downward (with respect to the orientation shown in FIG. 2A). This compresses the trigger spring 418, which then biases the trigger 510 back to the rest position when the operator releases the trigger 510.

As best shown in FIGS. 1A, 1B, 2A, 2B, 6A, 6B, and 6C, part of the combustion chamber sealing assembly 400 is received in the first and second combustion chambers and extends outside the tool 10 via an exhaust opening defined in the combustion and drive cylinder cover 200. The combustion chamber sealing assembly 400 is movable within the first and second combustion chambers relative to the combustion and drive cylinder 100, the combustion and drive cylinder cover 200, and the combustion cylinder 300 among an unsealed configuration (FIG. 6A), a sealed configuration (FIG. 6B), and a partially sealed configuration (FIG. 6C) based on the position of the trigger 510 and the pressure within the first combustion chamber.

More specifically, when the trigger 510 is in the rest position, the combustion chamber sealing assembly 400 is in the unsealed configuration shown in FIG. 6A. Since the trigger spring 418 biases the trigger 510 to the rest position, the trigger spring 418 also biases the combustion chamber sealing assembly 400 to the unsealed configuration shown in FIG. 6A. In the unsealed configuration, the first seat disc 404 is disengaged from a valve seat 619a of a fuel/air director 619 of a fuel routing subassembly 610 of the fuel assembly 600 (described below), which means that the first combustion chamber is in fluid communication with the fuel assembly 600. Similarly, the second seat disc 408 is disengaged from the second valve seat 318 of the combustion cylinder 300, which means that the first combustion chamber is in fluid communication with the second combustion chamber. Additionally, the third seat disc or cover-sealing portion 411 of the combustion chamber shaft 402 is removed from the exhaust opening formed in the combustion and drive cylinder cover 200, which means that the second combustion chamber is in fluid communication with the atmosphere.

Figure 6B:
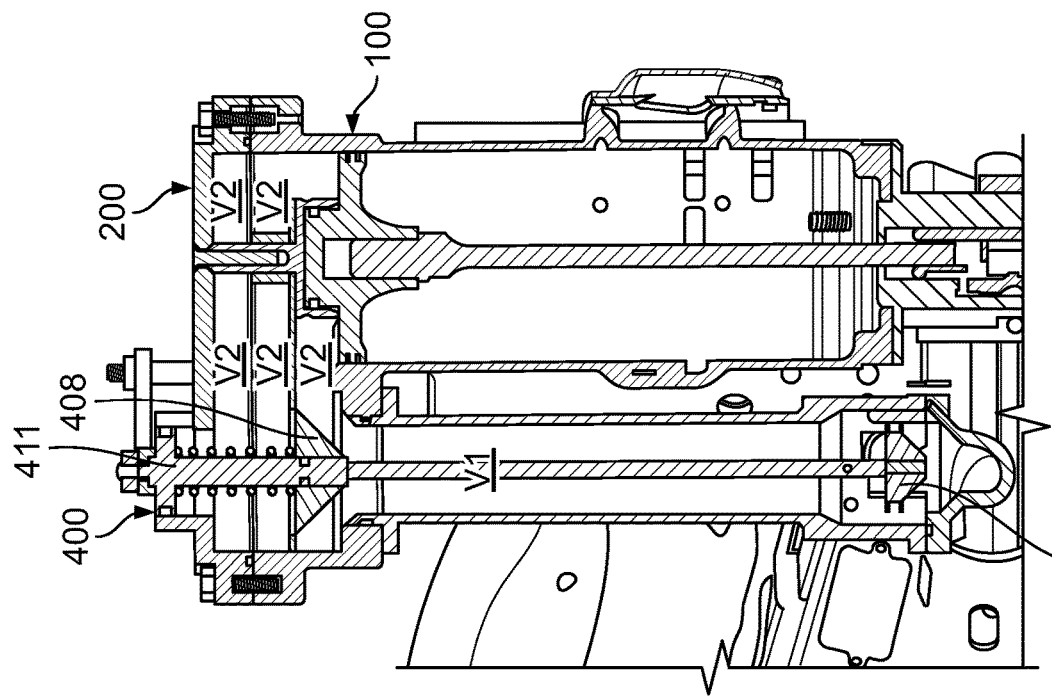
Figure 6C:
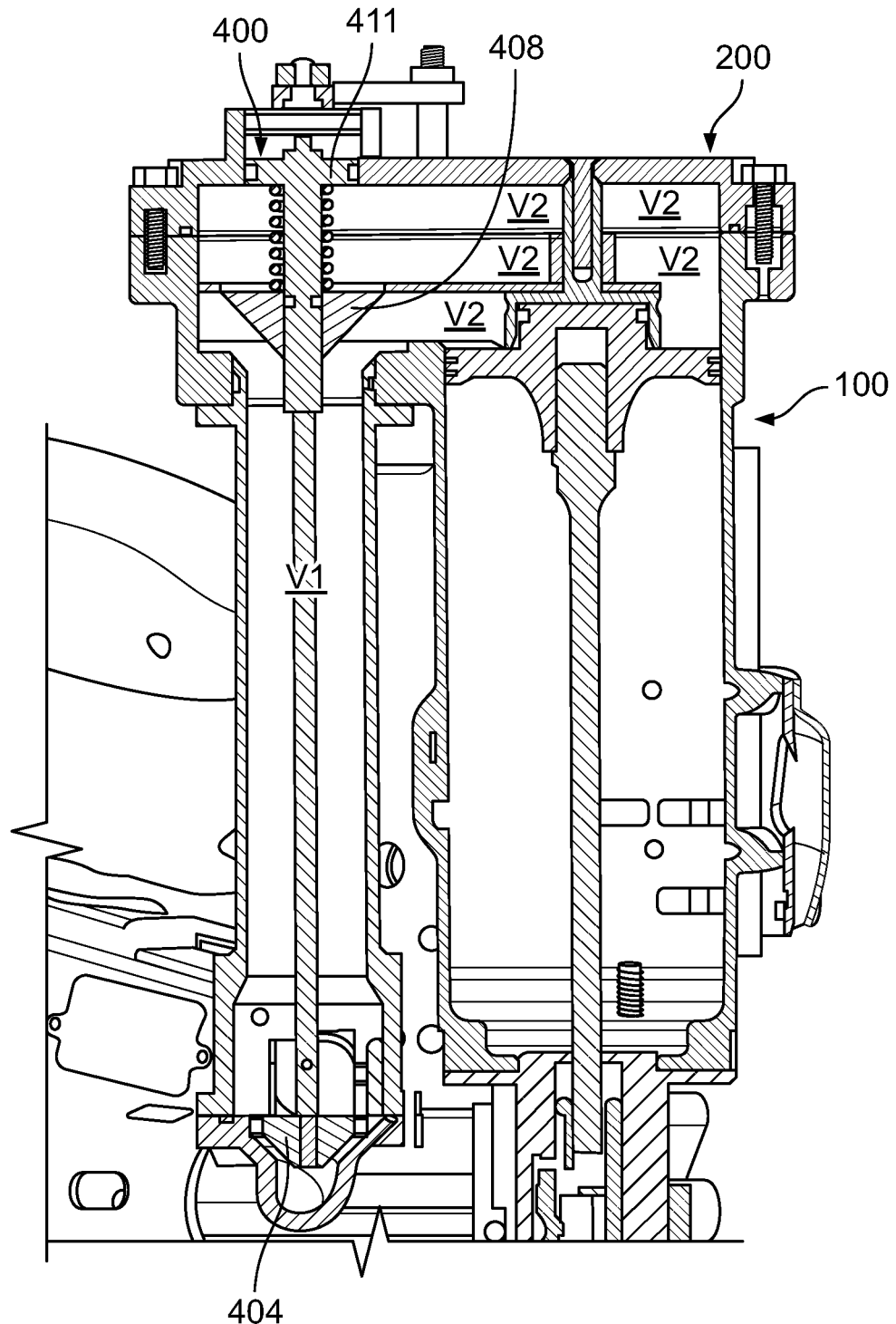

When the trigger 510 is in the actuated position and the biasing force of the second seat disc spring 410 has not been overcome, the combustion chamber sealing assembly 400 is in the sealed configuration shown in FIG. 6B. In the sealed configuration, the first seat disc 404 is sealingly engaged to the valve seat 619a of the fuel/air director 619 of the fuel routing subassembly 610 of the fuel assembly 600 (described below), which means that the first combustion chamber is not in fluid communication with the fuel assembly 600. Similarly, the second seat disc 408 is sealingly engaged to the second valve seat 318 of the combustion cylinder 300, which means that the first combustion chamber is not in fluid communication with the second combustion chamber. Additionally, the third seat disc or cover-sealing portion 411 of the combustion chamber shaft 402 is received in the exhaust opening formed in the combustion and drive cylinder cover 200, which means that the second combustion chamber is not in fluid communication with the atmosphere.

As described below, when the trigger 510 is moved to the actuated position to actuate the tool 10, combustion of the fuel/air mixture in the first combustion chamber forms pressure waves that overcome the biasing force of the second seat disc spring 410 and cause the second seat disc 408 to slide along and relative to the combustion chamber shaft 402 away from the retaining element 412 and toward the third seat disc or cover-sealing portion 411 of the combustion chamber shaft 402. This motion of the second seat disc 408 away from the biased position compresses the second seat disc spring 410. In this scenario, the combustion chamber sealing assembly 400 is in the partially sealed configuration shown in FIG. 6C. In the partially sealed configuration, the first seat disc 404 is sealingly engaged to the valve seat 619a of the fuel/air director 619 of the fuel routing subassembly 610 of the fuel assembly 600 (described below), which means that the first combustion chamber is not in fluid communication with the fuel assembly 600. On the other hand, the second seat disc 408 is disengaged from the second valve seat 318 of the combustion cylinder 300, which means that the first combustion chamber is in fluid communication with the second combustion chamber. Additionally, the third seat disc or cover-sealing portion 411 of the combustion chamber shaft 402 is received in the exhaust opening formed in the combustion and drive cylinder cover 200, which means that the second combustion chamber is not in fluid communication with the atmosphere.

Referring now to FIGS. 7 to 13B, the fuel assembly 600 is shown and described in further detail.

Figure 7:
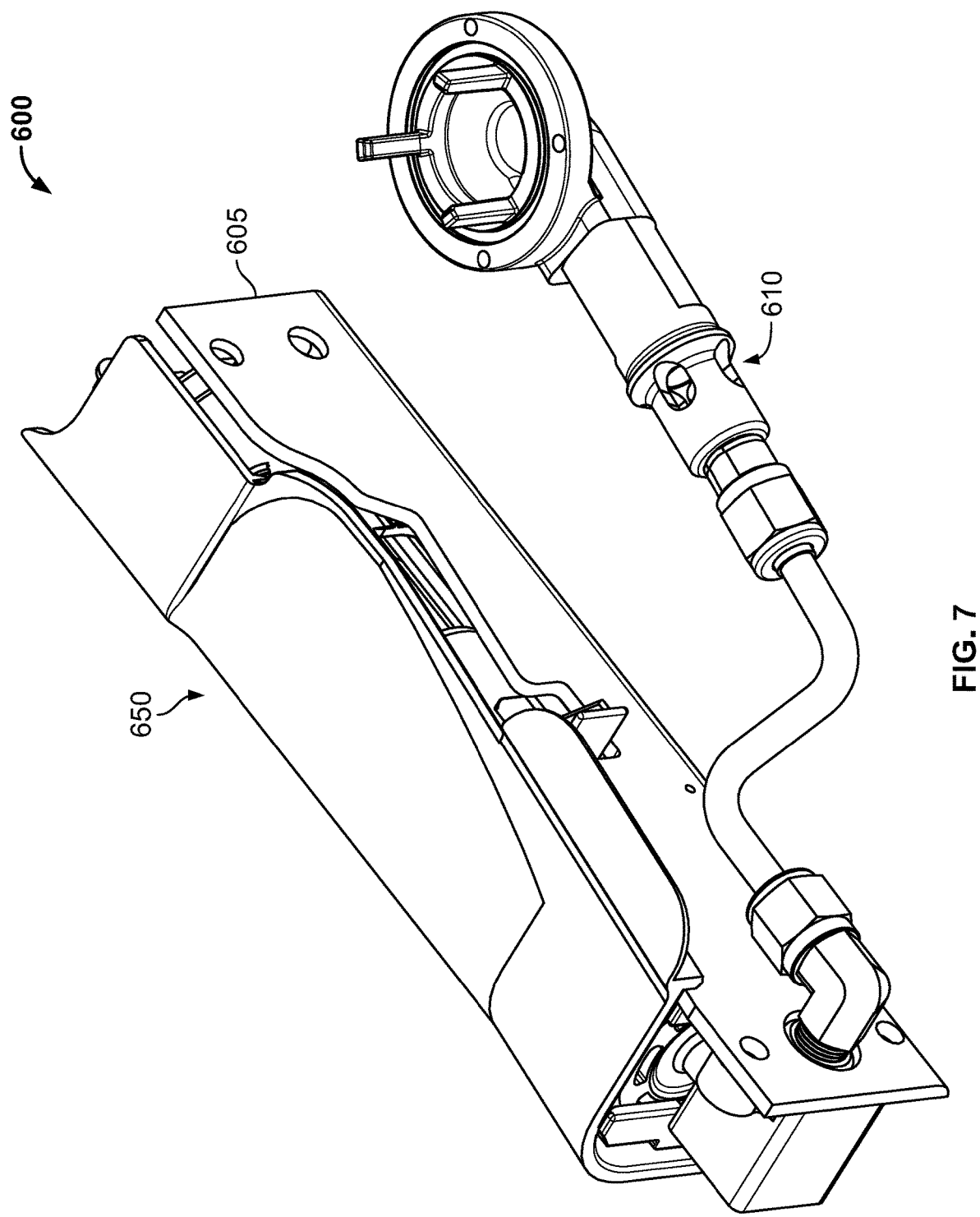
FIG. 7 is a perspective view of a fuel assembly of the tool of FIG. 1A.

As best shown in FIG. 7, the fuel assembly 600 includes a fuel assembly mounting plate 605, a fuel routing subassembly 610 attached to the fuel assembly mounting plate 605 via fasteners (not shown), and a canister mounting subassembly 650 attached to the fuel assembly mounting plate 605 via a mounting pin 601.

Figure 10A:
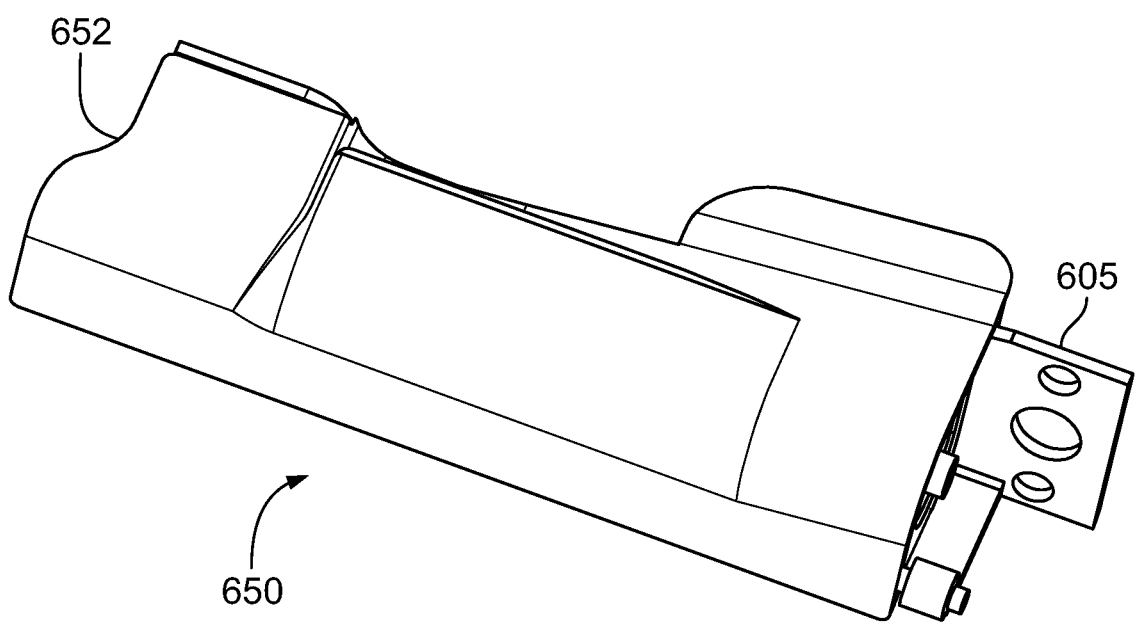
FIG. 10A is a perspective view of canister-mounting subassembly of the fuel assembly of FIG. 7.
Figure 10B:
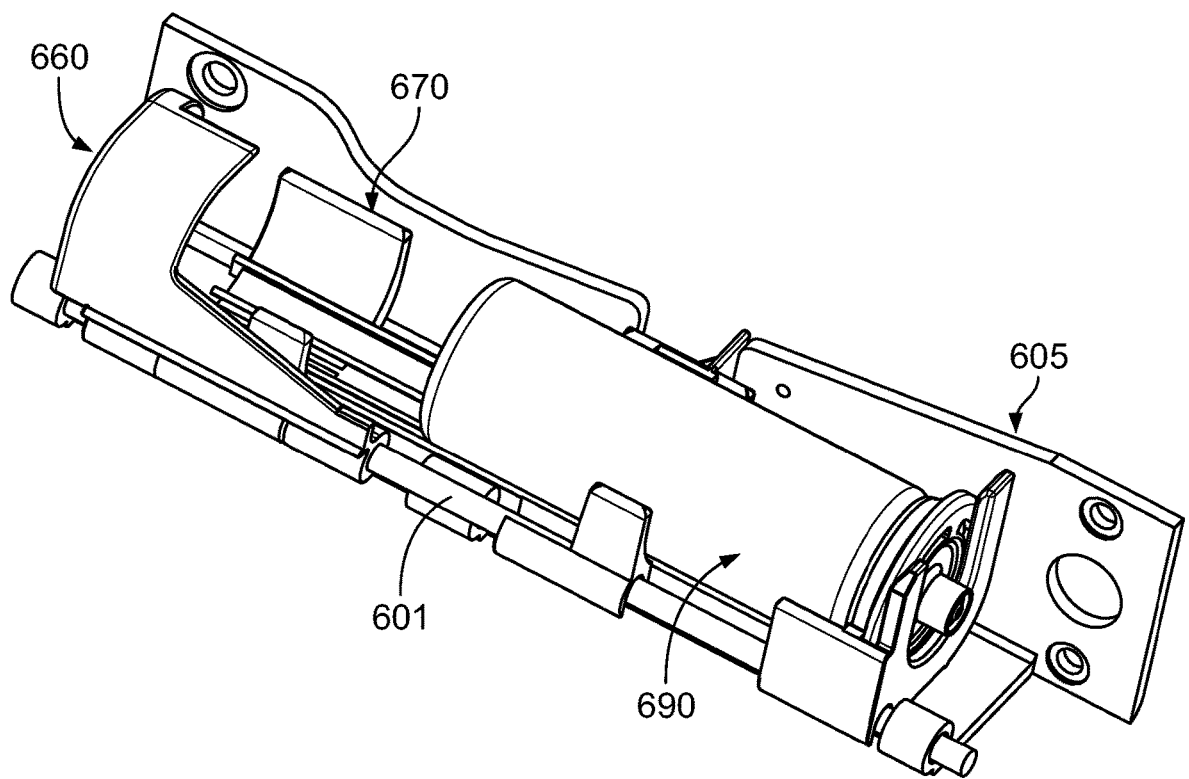
FIG. 10B is a perspective view of the canister-mounting subassembly of FIG. 10A with certain components removed.
Figure 13A:
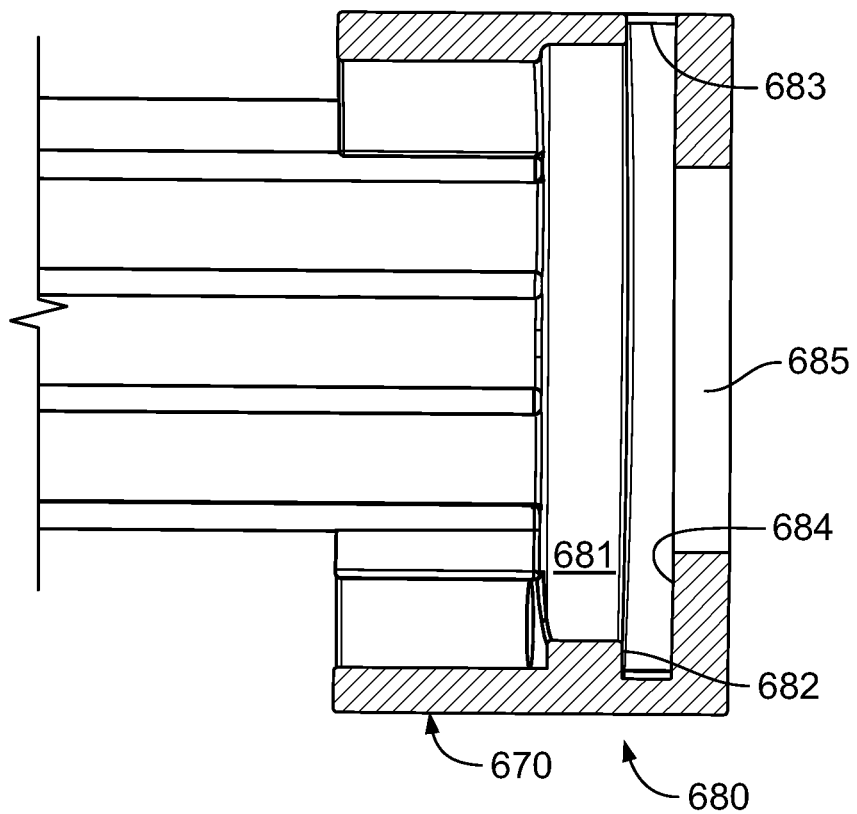
FIG. 13A is a cross-sectional view of a fuel canister closure engager of the canister-mounting carriage of FIG. 12A.
Figure 13B:
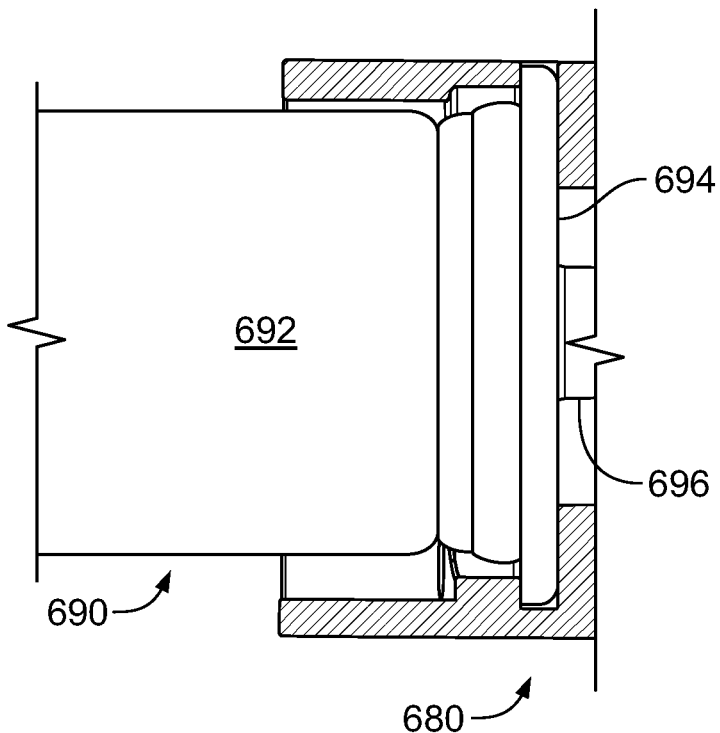
FIG. 13B is a cross-sectional view of the fuel canister closure engager of FIG. 13A in which a fuel canister is received.

In this example embodiment, as best shown in FIGS. 10B, 13A, and 13B, a fuel canister 690 is configured to be received in the canister mounting subassembly 650 and to dispense fuel to the fuel routing subassembly 610, as described below. The fuel canister 690 includes an outer housing 692, a closure 694 at one end of the outer housing 692, and a reciprocatable fuel valve stem 696 extending from the closure 694 and in fluid communication with a fuel repository within the outer housing 692. The closure 694 includes an outer circumferential lip 694a.

Figure 8:
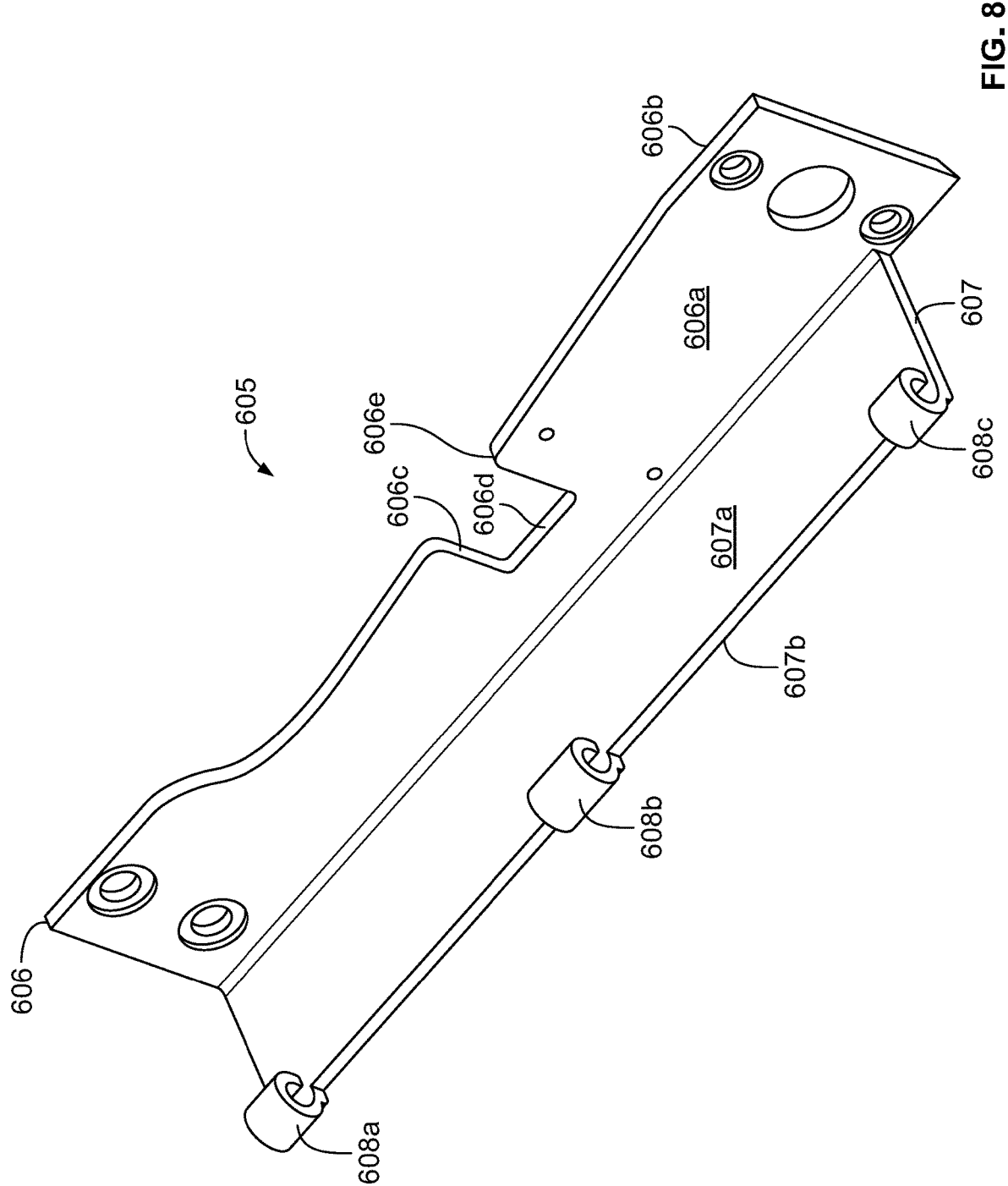
FIG. 8 is a perspective view of a fuel assembly mounting plate of the fuel assembly of FIG. 7.

As best shown in FIG. 8, the fuel assembly mounting plate 605 includes a generally planar first wall 606; a generally planar second wall 607 extending transversely from and integrally formed with the first wall 606; and first, second, and third spaced-apart tubular mounting elements 608a, 608b, and 608c that each define a mounting opening there through and that are integrally formed with the second wall 607. The mounting openings share the same longitudinal axis and are each sized to receive the mounting pin 601. The first wall 606 includes a first wall inner surface 606a; a first wall outer surface 606b; and first, second, and third slot-defining surfaces 606c, 606d, and 606e that together define a carriage locating slot. The second wall 607 includes a second wall inner surface 607a and a second wall outer surface 607b.

Figure 9:
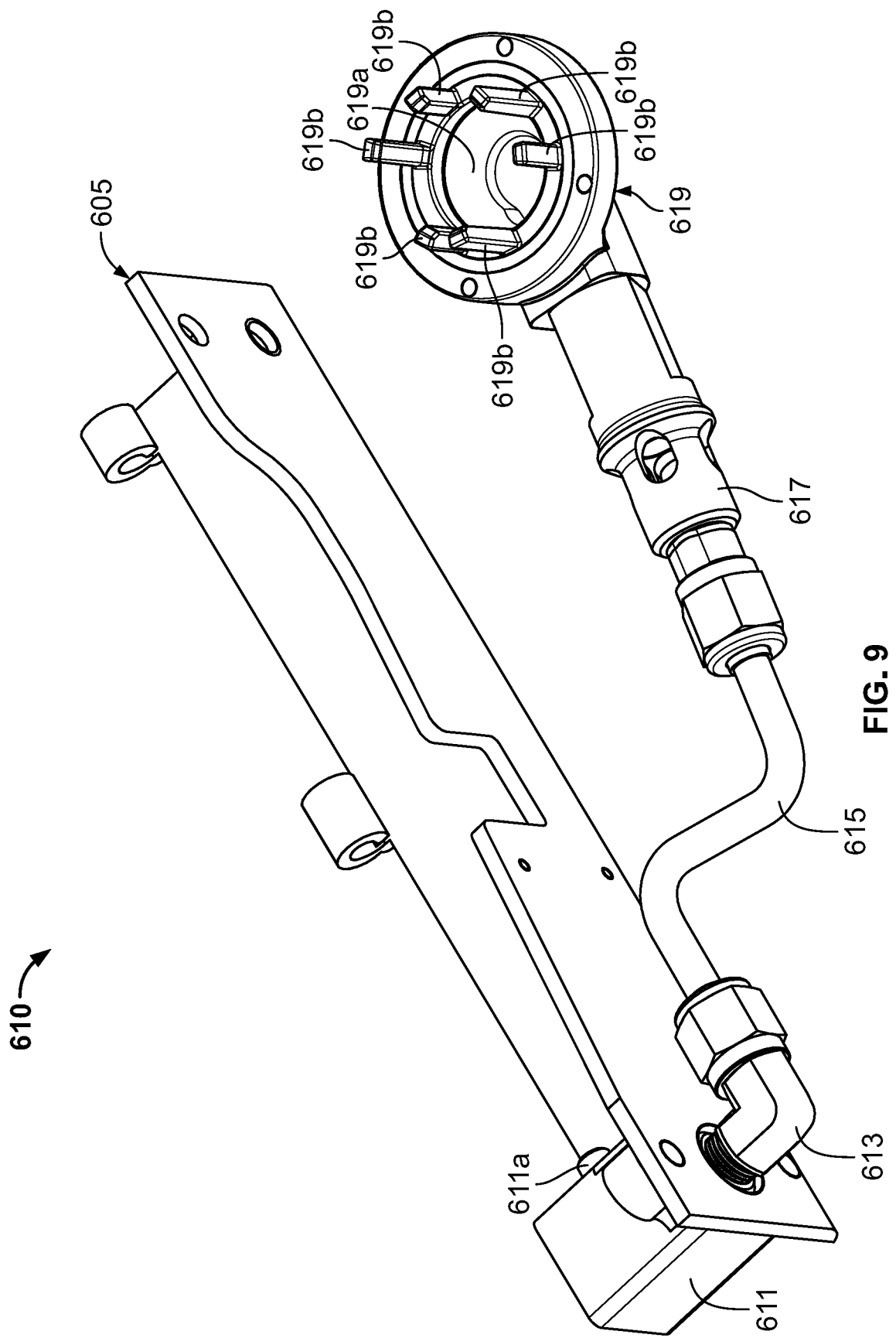
FIG. 9 is a perspective view of a fuel routing subassembly of the fuel assembly of FIG. 7.

As best shown in FIG. 9, the fuel routing subassembly 610 includes a fuel receiver 611 that defines a fluid inlet (via a fuel receiver inlet tube 611a) and a fluid outlet; an elbow joint 613 that defines a fluid inlet and a fluid outlet; a flexible metal tube 615 that includes a first portion defining a fluid inlet and having a first longitudinal axis, a second portion defining a fluid outlet and having a second longitudinal axis, and a connecting portion extending between and fluidly connecting the first and second portions and having a third longitudinal axis, a suitable jet pump or venturi pump 617 that defines a fluid inlet and a fluid outlet, and a fuel/air director 619 that defines a fluid inlet and a fluid outlet and that includes a first valve seat 619a and multiple combustion cylinder locators 619b. In this illustrated example embodiment, the venturi pump functions as or acts as a jet pump. In this example embodiment, the first and second longitudinal axes are parallel and offset from one another, and the third longitudinal axis is transverse to the first and second longitudinal axes. Additionally, in this embodiment the first, second, and third longitudinal axes are coplanar.

The fuel receiver 611 is attached to the first wall 606 of the fuel assembly mounting plate 605 via fasteners (not shown), and is positioned such that the fuel receiver inlet tube 611a can be received in the fuel valve stem 696 of the fuel canister 690 and fluidically communicate with the interior of the fuel canister 690 (described below) when the fuel canister 690 is received in the canister mounting subassembly 650. The elbow joint 613 is attached to the fuel receiver 611 such that the fluid inlet of the elbow joint 613 is in fluid communication with the fluid outlet of the fuel receiver 611. In certain embodiments, the fuel receiver 611 includes a suitable evaporator (not shown). The flexible metal tube 615 is attached to the elbow joint 613 via a suitable fitting such that the fluid inlet of the flexible metal tube 615 is in fluid communication with the fluid outlet of the elbow joint 613. The jet pump 617 is attached to the flexible metal tube 615 via a suitable fitting such that the fluid inlet of the jet pump 617 is in fluid communication with the fluid outlet of the flexible metal tube 615. The fuel/air director 619 is attached to the jet pump 617 such that the fluid inlet of the fuel/air director 619 is in fluid communication with the fluid outlet of the jet pump 617. The fuel/air director 619 is attached to the combustion cylinder 300 via suitable fasteners such that the combustion cylinder locators 619b are located within the combustion cylinder 300 and the fluid outlet of the fuel/air director 619 is in fluid communication with the first combustion chamber.

In operation, fuel dispensed from the fuel canister 690 (described below) is received at the fuel inlet of the fuel receiver 611 and travels from the fuel receiver 611 through the elbow joint 613 and the flexible metal tube 615 to the fuel inlet of the jet pump 617. The jet pump 617 is sized and shaped such that the Venturi effect causes air to be drawn into the jet pump 617 and mixed with the fuel as it passes through the jet pump 617. The jet pump has a suitable restrictor (not shown) incorporated in it to increase the velocity of the gas which flows through it and facilitate the low pressure which in turn draws the ambient air into the system. The fuel/air mixture flows from the jet pump 617 and into the fuel/air director 619, which directs the fuel/air mixture into the first combustion chamber.

The flexible metal tube 615 is sized, shaped, and formed from a metallic material with suitable properties to enable the flexible metal tube 615 to bend to absorb forces imposed on the fuel routing subassembly 610 during actuation of the tool 10. The ability of the flexible metal tube 615 to act as a shock absorber isolates more fragile components, like the jet pump 617, from forces generated during actuation of the tool 10 (or at least reduces the forces imposed on those more fragile components). The metallic tube also provided the additional benefit of aiding in vaporization of the fuel that enables the fuel to be in gaseous state prior to entering the jet pump to work effectively.

As best shown in FIGS. 10A and 10B, the canister mounting subassembly 650 includes a canister mounting subassembly cover 652, a carriage mover 660, and a canister-mounting carriage 670 configured to receive and hold the fuel canister 690.

Figure 11A:
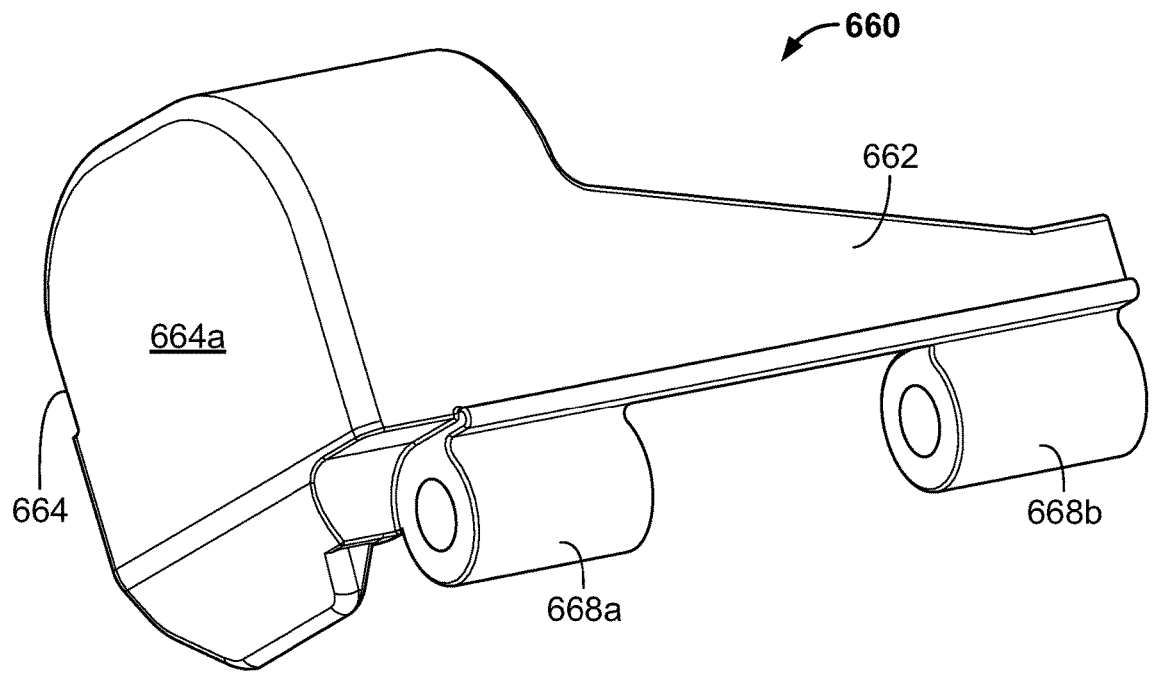
FIGS. 11A and 11B are perspective views of a carriage mover of the canister-mounting subassembly of FIG. 10A.
Figure 11B:
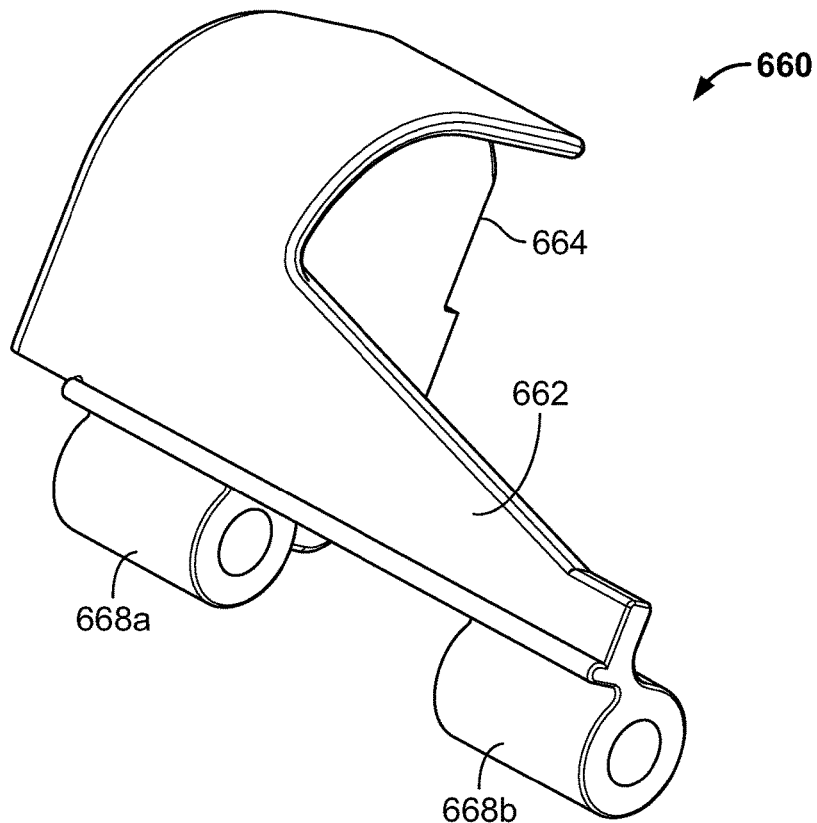

As best shown in FIGS. 11A and 11B, the carriage mover 660 includes a side/front wall 662 and a top wall 664 integrally formed with the side/front wall 662. The top wall includes a canister mover contact surface 664a. The carriage mover 660 also includes first and second mounting elements 668a and 668b integrally formed with the side/front wall 662 that define mounting openings. The mounting openings share the same longitudinal axis and are sized to receive the mounting pin 601.

Figure 12A:
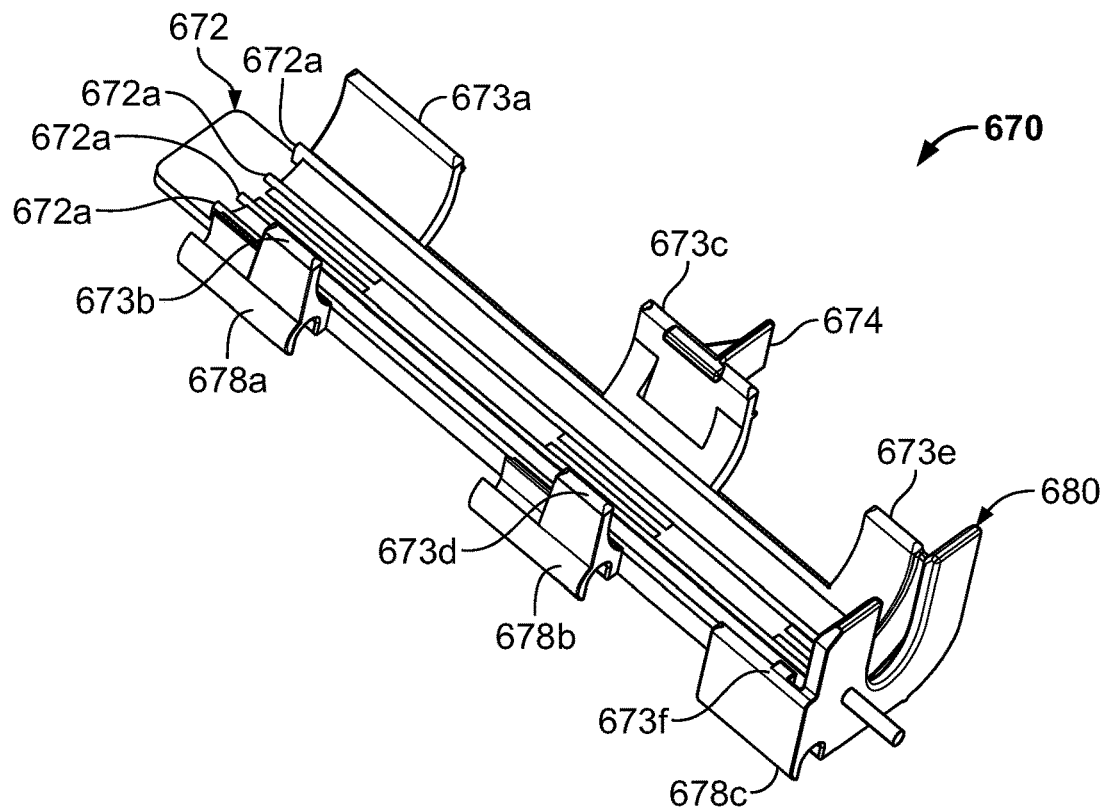
FIGS. 12A and 12B are perspective views of a canister-mounting carriage of the canister-mounting subassembly of FIG. 10A.
Figure 12B:
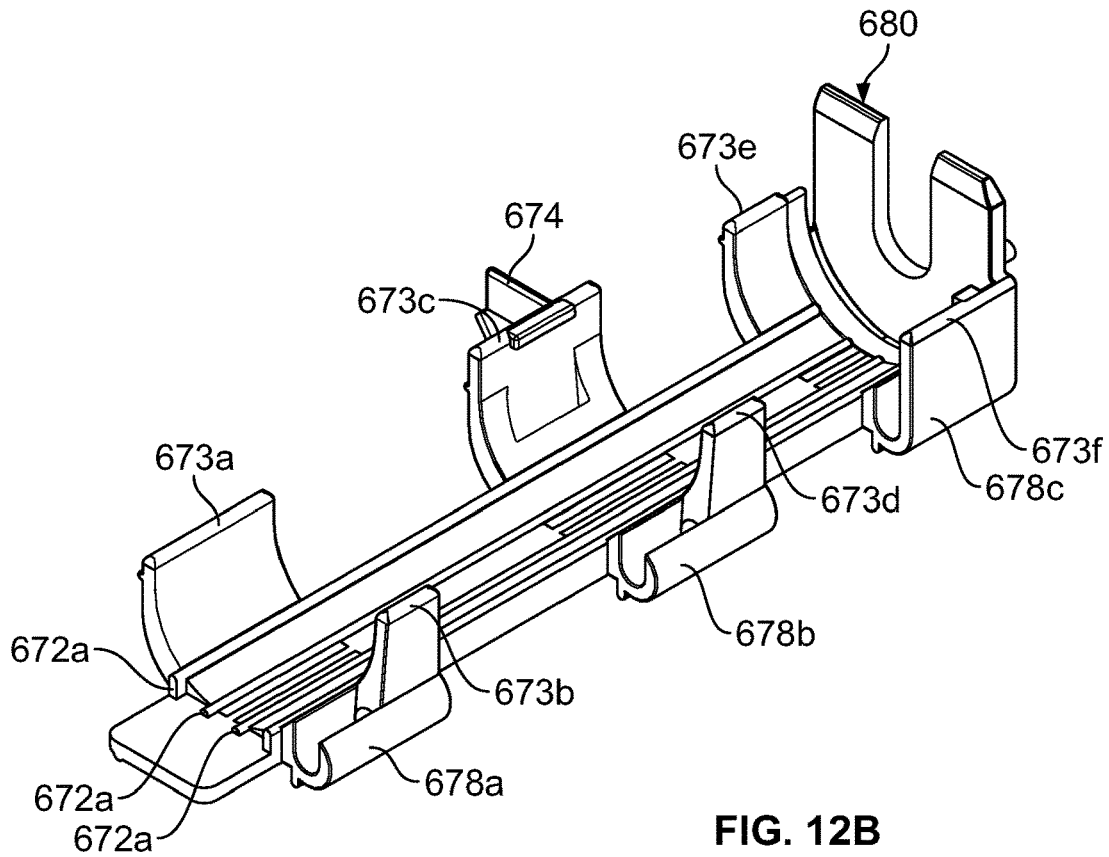

As best shown in FIGS. 12A and 12B, the canister-mounting carriage 670 includes a body 672 including longitudinally extending ribs 672a; first, second, and third spaced-apart pairs of canister-holding fingers 673a and 673b, 673c and 673d, and 673e and 673f integrally formed with the body 672; first, second, and third spaced-apart mounting elements 678a, 678b, and 678c; and a fuel canister closure engager 680 integrally formed with the body 672. The mounting elements 678a, 678b, and 678c each define a mounting opening. The mounting openings share the same longitudinal axis and are sized to receive the mounting pin 601. The canister-retaining fingers 673 are sized and shaped such that each pair of canister-retaining fingers 673 is configured to hold the outer housing 692 of the fuel canister 690 via a snap fit. The pairs of canister-retaining fingers 673 are spaced apart to accommodate fuel canisters of varying lengths.

As best shown in FIGS. 13A and 13B, the fuel canister closure engager 680 includes walls 682, 683, and 684 that define a lip-receiving channel sized and shaped to receive the lip 694a of the closure 694 of the fuel canister 690. In this embodiment, the height of the lip-receiving channel is the same as or slightly smaller than the height of the lip 694a such that the fuel canister closure engager 680 retains the lip 694a via an interference fit. The combination of this interference fit along with the snap-fit provided by the canister-retaining fingers 673 ensure that once the canister-mounting carriage 670 receives the fuel canister 690, the fuel canister 690 moves with the canister-mounting carriage 670 as described below.

As best shown in FIGS. 10A and 10B, the canister mounting subassembly cover 652, the carriage mover 660, and the canister-mounting carriage 670 are mounted to the fuel assembly mounting plate 605 via aligning their respective mounting openings and sliding the mounting pin 601 therethrough.

Once mounted, the canister mounting subassembly cover 652 is rotatable about the mounting pin 601 relative to the fuel assembly mounting plate 605, the carriage mover 660, and the canister-mounting carriage 670 (among other components) between a closed position (shown in FIGS. 1A and 1B) in which the loaded fuel canister 690 is not accessible and an open position (not shown) in which the loaded fuel canister 690 is accessible.

Once mounted, the carriage mover 660 and the canister-mounting carriage 670 are longitudinally movable relative to the fuel assembly mounting plate 605, the fuel routing subassembly 610, and the canister mounting subassembly cover 652 (among other components) from a rest position to a dispense position. When the fuel canister 690 is loaded in the canister-mounting carriage 670, a biasing element of the fuel canister 690 biases the carriage mover 660 and the canister-mounting carriage 670 to the rest position. As described below, movement of the canister mover 1000 causes the canister mover 1000 to move from its rest position to its dispense position to force the carriage mover 660 to contact and move the canister-mounting carriage 670 from its rest position to its dispense position to cause the fuel canister 690 to dispense a metered amount of fuel to the fuel routing subassembly 610.

As best shown in FIGS. 14A and 14B, the nosepiece assembly 900 includes a nosepiece 905, a workpiece-contact element 910, a sleeve 920, and a sleeve spring 930.

The workpiece-contact element 910 is partially received in the nosepiece 905 and is movable relative to the nosepiece 905 between an extended position and a retracted position. A workpiece-contact element spring (not shown) biases the workpiece-contact element 910 to the extended position. The workpiece-contact element 910 includes a sleeve engager (not labeled).

The sleeve 920 is slidably mounted to the exterior of the nosepiece 905 and movable relative to the nosepiece 905 between a rest position and a dispense position. The sleeve spring 930 biases the sleeve 920 to the rest position in which it contacts with the sleeve engager of the workpiece-contact element 910. Movement of the workpiece-contact element 910 from the extended position to the retracted position forces (via the sleeve engager) the sleeve 920 to move from the rest position to the dispense position. The sleeve 920 includes a cartridge mover engager 925.

The cartridge mover 1000 is attached to the combustion and drive cylinder 100 such that it is positioned between the sleeve 920 and the carriage mover 660. The cartridge mover 1000 is rotatable between a rest position and a dispense position. When the fuel canister 690 is loaded in the canister-mounting carriage 670 and the workpiece-contact element 910 is in its extended position, the biasing element of the fuel canister 690 biases the carriage mover 660 (and thus the canister-mounting carriage 670) to the rest position, which causes the carriage mover 660 to force the cartridge mover 1000 to its rest position. When the workpiece-contact element 910 moves to its retracted position, the workpiece-contact element 910 forces the sleeve 920 to move to its dispense position. As this occurs, the cartridge mover engager 925 of the sleeve 920 contacts the cartridge mover 1000 and forces it to move from its rest position to its dispense position. As this occurs, the cartridge mover 1000 contacts the carriage mover 660 and forces the carriage mover 660 to contact and move the canister-mounting carriage 670 from its rest position to its dispense position to cause the fuel canister 690 to dispense a metered dose of fuel into the fuel routing subassembly 610.

FIGS. 14A to 14F show selected components of the tool 10 at different stages of actuation of the tool 10, the first and second chambers as generally indicated by V1 and V2, and the general flow of the fuel/air mixture.

FIG. 14A shows the tool 10 when the fuel canister 690 is loaded in the canister-mounting subassembly 650, the workpiece-contact element 910 is in its extended position, the carriage mover 660 is in its rest position, the canister-mounting carriage 670 is in its rest position, the canister mover 1000 is in its rest position, the trigger 510 is in its rest position, and the combustion chamber sealing assembly 400 is in its unsealed configuration.

FIG. 14B shows the tool 10 after the workpiece-contact element 910 has been depressed against a workpiece (not labeled) and moved from its extended position to its retracted position. The movement of the workpiece-contact element 910 caused the sleeve 920 to move from its rest position to its dispense position, which in turn caused the canister mover 1000 to move from its rest position to its dispense position, which in turn caused the carriage mover 660 to move the canister-mounting carriage 670 from its rest position to its dispense position to cause the fuel canister 690 to dispense a metered dose of fuel into the fuel routing subassembly 610.

Although not shown, the fuel routing subassembly 610 adds air to the fuel and routes the fuel/air mixture into the first combustion chamber. Since the trigger 510 is in its rest position and the combustion chamber sealing assembly is in its unsealed configuration, the fuel/air mixture travels from the first combustion chamber into the second combustion chamber. FIG. 14C shows the tool 10 after the fuel/air mixture has reached the first and second combustion chambers.

FIG. 14D shows the tool 10 just after the trigger 510 reaches the actuated position and the combustion chamber sealing assembly 400 reaches the sealed configuration. At this point, the first seat disc 404 is sealingly engaged to the valve seat 619a of the fuel/air director 619 of the fuel routing subassembly 610 of the fuel assembly 600 (described below), which means that the first combustion chamber is not in fluid communication with the fuel assembly 600. Similarly, the second seat disc 408 is sealingly engaged to the second valve seat 318 of the combustion cylinder 300, which means that the first combustion chamber is not in fluid communication with the second combustion chamber. Additionally, the third seat disc or cover-sealing portion 411 of the combustion chamber shaft 402 is received in the exhaust opening formed in the combustion and drive cylinder cover 200, which means that the second combustion chamber is not in fluid communication with the atmosphere. Additionally, the electrode 406 is positioned at a generating position adjacent the spark generator (not labeled) attached to the combustion cylinder 300.

The trigger 510 actuates a trigger switch (not shown) as it reaches the actuated position. The trigger switch is operatively connected to the spark generator to cause the spark generator to generate a spark between it and the electrode 406 when the trigger switch is actuated. Thereafter, in various embodiments, laminar flame fronts can be developed within the first combustion chamber and propagate toward the second combustion chamber, pushing uncombusted fuel/air mixture in that direction.

As shown in FIG. 14E, the moving flame fronts within the first combustion chamber pressurize the uncombusted fuel/air mixture until the fuel/air mixture forces the second seat disc 408 to move away from the biased position such that the combustion chamber sealing assembly 400 is in the partially sealed configuration. This fluidly connects the first and second combustion chambers, and the combusted fuel/air mixture in front of the flame fronts moves from the first combustion chamber to the second combustion chamber, increasing the pressure in the second combustion chamber.

As shown in FIG. 14F, as soon as the first flame front propagates from the first combustion chamber into the second combustion chamber, that flame ignites the fuel/air mixture in the second combustion chamber. This creates a large pressure spike that forces the second seat disc 408 to return to the biased position and also forces the piston 160 to move from the pre-drive position to the drive position, during which the driver blade 170 contacts a fastener (not shown) in the nosepiece 905 and drives the fastener into the workpiece.

It should be appreciated that in various embodiments of the present disclosure, the combustion and drive cylinder are separate or separated.

It should be appreciated from the above that the present disclosure provides a fastener-driving tool comprising: a first combustion cylinder partially defining a first combustion chamber; a fuel assembly configured to direct a fuel/air mixture to the first combustion chamber; a second combustion cylinder attached to the first combustion cylinder and partially defining a second combustion chamber; and a combustion chamber sealing assembly comprising a combustion chamber shaft, a first seat disc fixedly attached to the combustion chamber shaft, a second seat disc slidably mounted to the combustion chamber shaft, and a second seat disc biasing element that biases the second seat disc to a biased position, wherein when the combustion chamber sealing assembly is in an unsealed configuration, the first seat disc is disengaged from a first valve seat and the second seat disc is disengaged from a second valve seat such that the fuel assembly, the first combustion chamber, and the second combustion chamber are in fluid communication, wherein when the combustion chamber sealing assembly is in a sealed configuration, the first seat disc sealingly engages the first valve seat and the second seat disc sealingly engages the second valve seat such that the fuel assembly, the first combustion chamber, and the second combustion chamber are not in fluid communication, and wherein when the combustion chamber sealing assembly is in a partially sealed configuration, the first seat disc sealingly engages the first valve seat and the second seat disc is displaced from the biased position and disengaged from a second valve seat such that the fuel assembly and the first combustion chamber are not in fluid communication and the first combustion chamber and the second combustion chamber are in fluid communication.

In various such embodiments of the fastener-driving tool, the first combustion cylinder is a combustion and drive cylinder.

In various such embodiments, the fastener-driving tool includes a trigger movable between a rest position and an actuated position.

In various such embodiments of the fastener-driving tool, the combustion chamber sealing assembly is attached to the trigger such that movement of the trigger from the rest position to the actuated position causes the combustion chamber sealing assembly to move from the unsealed configuration to the sealed configuration.

In various such embodiments of the fastener-driving tool, the combustion chamber sealing assembly includes a trigger biasing element that biases the trigger to the rest position and the combustion chamber sealing assembly to the unsealed configuration.

In various such embodiments of the fastener-driving tool, the combustion chamber sealing assembly includes a trigger shaft, wherein the trigger shaft is attached to the combustion chamber shaft and to the trigger.

In various such embodiments of the fastener-driving tool, the combustion chamber sealing assembly includes a linkage that attaches the trigger shaft to the combustion chamber shaft.

In various such embodiments of the fastener-driving tool, the trigger shaft includes a trigger biasing element seat and the trigger biasing element is disposed around the trigger shaft and extends between the trigger biasing element seat and a surface of the combustion and drive cylinder.

In various such embodiments of the fastener-driving tool, the second seat disc is frustoconical.

In various such embodiments of the fastener-driving tool, the second seat disc is formed from a metallic material.

In various such embodiments of the fastener-driving tool, the combustion chamber sealing assembly includes an electrode removably attached to the combustion chamber shaft.

In various such embodiments, the fastener-driving tool includes a spark generator removably attached to the first combustion cylinder, wherein when the combustion chamber sealing assembly is in the sealed configuration, the electrode is located at a generating position adjacent the spark generator to enable a spark to be generated between the spark generator and the electrode, and wherein when the combustion chamber sealing assembly is in the unsealed configuration, the electrode is displaced from the generating position.

In various such embodiments of the fastener-driving tool, the fuel assembly comprises: a fuel receiver configured to receive fuel dispensed from a fuel canister removably received in the fuel assembly; a tube in fluid communication with the fuel receiver; and a jet pump in fluid communication with the tube and configured to create the fuel/air mixture as the dispensed fuel travels through the jet pump.

In various such embodiments of the fastener-driving tool, the fuel assembly includes an evaporator.

In various such embodiments of the fastener-driving tool, the tube includes a first portion defining a fluid inlet and having a first longitudinal axis, a second portion defining a fluid outlet and having a second longitudinal axis, and a third portion extending between and fluidly connecting the first and second portions and having a third longitudinal axis.

In various such embodiments of the fastener-driving tool, the first longitudinal axis and the second longitudinal axis are parallel and offset, and the third longitudinal axis is transverse to the first and second longitudinal axes.

In various such embodiments of the fastener-driving tool, the first, second, and third longitudinal axes are coplanar.

In various such embodiments of the fastener-driving tool, the combustion chamber sealing assembly includes a third seat disc fixedly attached to the combustion chamber shaft.

It should further be appreciated from the above that the present disclosure provides a fastener-driving tool comprising: a first combustion cylinder defining a combustion chamber; a fuel assembly comprising: a fuel routing subassembly configured to direct a fuel/air mixture to the first combustion chamber; and a canister-mounting carriage movable relative to the fuel routing subassembly between a rest position and a dispense position, the canister-mounting carriage configured to hold a fuel canister such that the fuel canister moves with the canister-mounting carriage; and a canister mover movable from a rest position to a dispense position to cause the canister-mounting carriage to move from the rest position to the dispense position.

In various such embodiments, the fastener-driving tool includes a workpiece-contact element movable between an extended position and a retracted position, wherein movement of the workpiece-contact element form the extended position to the retracted position causes the canister mover to move from the rest position to the dispense position.

In various such embodiments of the fastener-driving tool, the canister-mounting carriage defines a lip-receiving channel sized to receive a lip of a cover of the fuel canister and to prevent the fuel canister from moving longitudinally and laterally relative to the canister-mounting carriage.

In various such embodiments of the fastener-driving tool, the canister-mounting carriage includes a pair of fingers sized and shaped to receive and retain an outer housing of the fuel canister.

In various such embodiments, the fastener-driving tool is configured to enable a biasing element of the fuel canister to bias the canister-mounting carriage to the rest position when the fuel canister is received in and held by the canister-mounting carriage.

In various such embodiments of the fastener-driving tool, the canister-mounting carriage includes a body including longitudinally extending ribs; first, second, and third spaced-apart pairs of canister-holding fingers formed with the body; first, second, and third spaced-apart mounting elements; and a fuel canister closure engager formed with the body.

In various such embodiments of the fastener-driving tool, the canister-retaining fingers are sized and shaped such that each pair of canister-retaining fingers is configured to hold the outer housing of the fuel canister via a snap fit.

In various such embodiments of the fastener-driving tool, the canister-retaining fingers are spaced apart to accommodate fuel canisters of varying lengths.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fastener-driving tool comprising: a housing; a combustion cylinder supported by the housing and defining a combustion chamber; a fuel assembly supported by the housing; and a canister mounting subassembly supported by the housing and including a fuel canister mounting carriage movable from a rest position to a dispense position, the fuel canister mounting carriage configured to removably receive a fuel canister, wherein the fuel canister mounting carriage includes: (a) a body including longitudinally extending ribs; (b) first, second, and third spaced-apart pairs of canister-retainer fingers formed with the body; (c) first, second, and third spaced-apart mounting elements; and (d) a fuel canister closure engager formed with the body.

2. The fastener-driving tool of claim 1, wherein the fuel canister mounting carriage is configured to removable receive fuel canister of a plurality of different lengths.

3. The fastener-driving tool of claim 1, wherein the canister mounting subassembly includes a canister mover.

4. The fastener-driving tool of claim 3, wherein the canister mover is coupled to the fuel canister mounting carriage to cause the fuel canister mounting carriage to move from the rest position to the dispense position.

5. The fastener-driving tool of claim 1, which includes a workpiece-contact element movable between an extended position and a retracted position, wherein movement of the workpiece-contact element from the extended position to the retracted position causes the canister mover to move the fuel canister mounting carriage.

6. The fastener-driving tool of claim 1, wherein the fuel canister mounting carriage defines a lip-receiving channel sized to receive a lip of a cover of the fuel canister and to prevent the fuel canister from moving longitudinally and laterally relative to the fuel canister mounting carriage.

7. The fastener-driving tool of claim 6, wherein the fuel canister mounting carriage includes a pair of fingers sized and shaped to receive and retain an outer housing of the fuel canister.

8. The fastener-driving tool of claim 1, which is configured to enable a biasing element of the fuel canister to bias the fuel canister mounting carriage to the rest position when the fuel canister is received in and held by the fuel canister mounting carriage.

9. The fastener-driving tool of claim 1, wherein the canister-retaining fingers are sized and shaped such that each pair of canister-retaining fingers is configured to hold an outer housing of the fuel canister via a snap fit.

10. The fastener-driving tool of claim 1, wherein the pairs of canister-retaining fingers are spaced apart to accommodate fuel canisters of varying lengths.

11. A fastener-driving tool comprising:
   a combustion cylinder defining a combustion chamber; and
   a fuel assembly comprising:
      a fuel routing subassembly configured to direct a fuel/air mixture to the combustion chamber;
      a canister-mounting carriage movable relative to the fuel routing subassembly from a rest position to a dispense position, the canister-mounting carriage configured to hold a fuel canister such that the fuel canister moves with the canister-mounting carriage; and
      a canister mover movable from a rest position to a dispense position to cause the canister-mounting carriage to move from the rest position to the dispense position,
      wherein the canister-mounting carriage defines a lip-receiving channel sized to receive a lip of a cover of the fuel canister and to prevent the fuel canister from moving longitudinally and laterally relative to the canister-mounting carriage; and wherein the canister-mounting carriage includes a pair of fingers sized and shaped to receive and retain an outer housing of the fuel canister.

12. The fastener-driving tool of claim 11, which includes a workpiece-contact element movable between an extended position and a retracted position, wherein movement of the workpiece-contact element form the extended position to the retracted position causes the canister mover to move the canister-mounting carriage from the rest position to the dispense position.

13. The fastener-driving tool of claim 11, which is configured to enable a biasing element of the fuel canister to bias the canister-mounting carriage to the rest position when the fuel canister is received in and held by the canister-mounting carriage.

14. The fastener-driving tool of claim 11, wherein the canister-mounting carriage includes a body including longitudinally extending ribs; first, second, and third spaced-apart pairs of canister-holding fingers formed with the body; first, second, and third spaced-apart mounting elements; and a fuel canister closure engager formed with the body.

15. The fastener-driving tool of claim 14, wherein the canister-retaining fingers are sized and shaped such that each pair of canister-retaining fingers is configured to hold the outer housing of the fuel canister via a snap fit.

16. The fastener-driving tool of claim 15, wherein the pairs of the canister-retaining fingers are spaced apart to accommodate fuel canisters of varying lengths.

17. A fastener-driving tool comprising:
a combustion cylinder defining a combustion chamber; and
a fuel assembly comprising:
a fuel routing subassembly configured to direct a fuel/air mixture to the combustion chamber;
a canister-mounting carriage movable relative to the fuel routing subassembly from a rest position to a dispense position, the canister-mounting carriage configured to hold a fuel canister such that the fuel canister moves with the canister-mounting carriage; and
a canister mover movable from a rest position to a dispense position to cause the canister-mounting carriage to move from the rest position to the dispense position,
wherein the canister-mounting carriage includes: (a) a body including longitudinally extending ribs; (b) first, second, and third spaced-apart pairs of canister-holding fingers formed with the body; (c) first, second, and third spaced-apart mounting elements; and (d) a fuel canister closure engager formed with the body.

18. The fastener-driving tool of claim 17, wherein the canister-retaining fingers are sized and shaped such that each pair of canister-retaining fingers is configured to hold the outer housing of the fuel canister via a snap fit.

19. The fastener-driving tool of claim 18, wherein the pairs of the canister-retaining fingers are spaced apart to accommodate fuel canisters of varying lengths.

20. The fastener-driving tool of claim 17, which includes a workpiece-contact element movable between an extended position and a retracted position, wherein movement of the workpiece-contact element form the extended position to the retracted position causes the canister mover to move the canister-mounting carriage from the rest position to the dispense position.

* * * * *